(12) United States Patent
Lee et al.

(10) Patent No.: US 8,345,753 B2
(45) Date of Patent: Jan. 1, 2013

(54) METHOD, MEDIUM, AND SYSTEM VISUALLY COMPRESSING IMAGE DATA

(75) Inventors: Sang-jo Lee, Suwon-si (KR); Si-hwa Lee, Seoul (KR); Do-hyung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1523 days.

(21) Appl. No.: 11/890,497

(22) Filed: Aug. 7, 2007

(65) Prior Publication Data

US 2008/0131087 A1 Jun. 5, 2008

(30) Foreign Application Priority Data

Nov. 30, 2006 (KR) .................. 10-2006-0120191

(51) Int. Cl.
*H04N 7/12* (2006.01)
(52) U.S. Cl. ............. 375/240.1; 375/240.23; 375/240.01
(58) Field of Classification Search ............... 375/240.01
See application file for complete search history.

(56) References Cited

U.S. PATENT DOCUMENTS

| | | | | |
|---|---|---|---|---|
| 5,388,209 | A * | 2/1995 | Akagiri ........................ | 704/229 |
| 6,078,689 | A | 6/2000 | Kunitake et al. | |
| 6,148,111 | A | 11/2000 | Creusere | |
| 6,208,689 | B1 * | 3/2001 | Ohira et al. ............... | 375/240.12 |
| 6,427,025 | B1 * | 7/2002 | Shimomura et al. .......... | 382/232 |
| 6,553,143 | B2 * | 4/2003 | Miyake et al. ................ | 382/239 |
| 7,421,132 | B2 * | 9/2008 | Okada .......................... | 382/238 |
| 2001/0054131 | A1 | 12/2001 | Alvarez, II et al. | |
| 2002/0094031 | A1 | 7/2002 | Ngai et al. | |
| 2003/0012275 | A1 | 1/2003 | Boice et al. | |
| 2003/0185297 | A1 | 10/2003 | Greenfield et al. | |

FOREIGN PATENT DOCUMENTS

| | | |
|---|---|---|
| JP | 10-098731 | 4/1998 |
| JP | 2000-83029 | 3/2000 |

OTHER PUBLICATIONS

Office Action mailed Apr. 12, 2012 in U.S. Appl. No. 11/890,496.
M. Roth, "CS 301 Course Notes", CS 301: Assembly Language Programming, University of Alaska Fairbanks, Nov. 1998, Online: http://www.cs.uaf.edu/~cs301/notes/Chapter5/node4.html.
U.S. Appl. No. 11/890,496, filed Aug. 7, 2007, Lee et al., Samsung Electronics Co., Ltd.
Japanese Notice of Reason for Rejection issued Nov. 25, 2011, corresponds to Japanese Patent Application No. 2007-282113.
Extended European Search Report dated Oct. 7, 2009 corresponding to European application No. 07121995.0-2223.

* cited by examiner

*Primary Examiner* — David Y Jung
(74) *Attorney, Agent, or Firm* — Staas & Halsey LLP

(57) ABSTRACT

A method, medium, and system compressing and/or reconstructing image data. The data compression method includes compressing current data according to a plurality of modes for compressing current data, determining whether the current data compressed according to the plurality of modes can be represented by a fixed length of bits, selecting a mode from among modes in which the compressed current data can be represented by the fixed length of bits, and outputting the compressed current data according to the selected mode. Accordingly, it is possible to significantly lower the complexity of an image encoder/decoder system, and exactly meet a picture-based Control Bit Rate (CBR) suitable for a Liquid Crystal Display Dynamic Capacitance Compensation (LCD DCC) device/system.

21 Claims, 21 Drawing Sheets

| 1 | MODE | G | R/B |
|---|---|---|---|
| ALLOCATION BIT | 4 | 12 | 8/8 |
| OPERATION | $D_m$ | $P_m >> 0 - N_n >> 0$ | $P_m >> 1 - N_n >> 1$ |
| DIFFERENCE RANGE | – | $-4 \sim 3$ | $-4 \sim 3$ |
| MAXIMUM ERROR (ORIGINAL—RECON.) | – | 0 | 1 |

FIG. 8

| N2 | N3 | N4 | N5 | N6 |
|----|----|----|----|----|
| N1 | P0 | P1 |    |    |
| N0 | P2 | P3 |    |    |

FIG. 9

| MODE | CODING MODE | BIT SHIFT [R/G/B] |
|------|-------------|-------------------|
| 0 | DPCM | 0/0/0 |
| 1 | DPCM | 1/0/1 |
| 2 | DPCM | 1/1/1 |
| 3 | DPCM | 2/1/2 |
| 4 | DPCM | 2/2/2 |
| 5 | DPCM | 3/2/3 |
| 6 | DPCM | 3/3/3 |
| 7 | DPCM | 4/3/4 |
| 8 | DPCM | 4/4/4 |
| 9 | DPCM | 5/4/5 |
| 10 | DPCM | 5/5/5 |
| 11 | PCM | 6/5/6 |
| 12 | RESERVED | N/A |
| 13 | RESERVED | N/A |
| 14 | RESERVED | N/A |
| 15 | RESERVED | N/A |

FIG. 10

| | MODE | G | R/B |
|---|---|---|---|
| ALLOCATION BIT | 4 | 12 | 8/8 |
| OPERATION | $D_m$ | $P_m >> 0 - N_n >> 0$ | $P_m >> 0 - N_n >> 0$ |
| DIFFERENCE RANGE | – | $-4 \sim 3$ | $-2 \sim 1$ |
| MAXIMUM ERROR (ORIGINAL→RECON.) | – | 0 | 0 |

MSB P0 P1 P2 P3

| 1 | MODE | G | R/B |
|---|------|---|-----|
| ALLOCATION BIT | 4 | 12 | 8/8 |
| OPERATION | $D_m$ | $P_m >> 0 - N_n >> 0$ | $P_m >> 1 - N_n >> 1$ |
| DIFFERENCE RANGE | — | $-4 \sim 3$ | $-4 \sim 3$ |
| MAXIMUM ERROR (ORIGINAL→RECON.) | — | 0 | 1 |

FIG. 14

| 4 | MODE | G | R/B |
|---|---|---|---|
| ALLOCATION BIT | 4 | 12 | 8/8 |
| OPERATION | $D_m$ | $P_m >> 2 - N_h >> 2$ | $P_m >> 2 - N_h >> 2$ |
| DIFFERENCE RANGE | — | $-6 \sim 15$ | $-8 \sim 7$ |
| MAXIMUM ERROR (ORIGINAL→RECON.) | — | 2 | 2 |

FIG. 15

R
MSB P0 P1 P2 P3
7 6 5 4 3 2 1 0

G
MSB P0 P1 P2 P3
7 6 5 4 3 2 1 0

B
MSB P0 P1 P2 P3
7 6 5 4 3 2 1 0

| 5 | MODE | G | R/B |
|---|---|---|---|
| ALLOCATION BIT | 4 | 12 | 8/8 |
| OPERATION | $D_m$ | $P_m >> 2 - N_n >> 2$ | $P_m >> 3 - N_n >> 3$ |
| DIFFERENCE RANGE | — | −16 ~ 15 | −16 ~ 15 |
| MAXIMUM ERROR (ORIGINAL→RECON.) | — | 2 | 4 |

| MODE | G | R/B |
|---|---|---|
| ALLOCATION BIT | 12 | 8/8 |
| OPERATION $D_m$ | $P_m >> 3 - N_n >> 3$ | $P_m >> 3 - N_n >> 3$ |
| DIFFERENCE RANGE | -32 ~ 31 | -16 ~ 15 |
| MAXIMUM ERROR (ORIGINAL→RECON.) | 4 | 4 |

FIG. 17

| 7 | MODE | G | R/B |
|---|---|---|---|
| ALLOCATION BIT | 4 | 12 | 8/8 |
| OPERATION | $D_m$ | $P_m >> 3 - N_n >> 3$ | $P_m >> 4 - N_n >> 4$ |
| DIFFERENCE RANGE | — | $-32 \sim 31$ | $-32 \sim 31$ |
| MAXIMUM ERROR (ORIGINAL→RECON.) | — | 4 | 8 |

| 10 | MODE | G | R/B |
|---|---|---|---|
| ALLOCATION BIT | 4 | 12 | 8/8 |
| OPERATION | $D_m$ | $P_m >> 5 - N_n >> 5$ | $P_m >> 5 - N_n >> 5$ |
| B PIXEL RANGE | – | $-128 \sim 127$ | $-64 \sim 63$ |
| MAXIMUM ERROR (ORIGINAL→RECON.) | – | 16 | 16 |

METHOD, MEDIUM, AND SYSTEM VISUALLY COMPRESSING IMAGE DATA

CROSS-REFERENCE TO RELATED APPLICATIONS

This application claims the priority of Korean Patent Application No. 2006-0120191, filed on Nov. 30, 2006, in the Korean Intellectual Property Office, the disclosure of which is incorporated herein in its entirety by reference.

BACKGROUND

1. Field of the Invention

One or more embodiments of the present invention relate to a system of compressing and/or reconstructing image data, and more particularly, to an image encoder/decoder system suitable for Liquid Crystal Display Dynamic Capacitance Compensation (LCD DCC) devices.

2. Description of the Related Art

FIG. 1 illustrates a portion of a conventional Liquid Crystal Display Dynamic Capacitance Compensation (LCD DCC) device.

Referring to FIG. 1, the conventional LCD DCC device includes a memory 11 and a Lookup Table (LUT) module 12. The LCD DCC device is used to apply a voltage higher than a required voltage to the pixels of a Thin Film Transistor (TFT)-LCD panel, in order to enhance the response time of the TFT-LCD panel. For example, if a current voltage of a pixel in the TFT-LCD panel is A and the following voltage of the pixel is B, the LCD DCC device applies the voltages to the pixel in the order of A->C->B (where C is a voltage higher than one of A and B) without applying the voltages to the pixel in the order of A->B. Hereinafter, a process in which a LCD DCC device calculates a voltage value for enhancing the response time of a TFT-LCD panel will be described, and then problems of such conventional techniques will be described.

Referring to FIG. 1, the memory 11 receives and stores information of a current picture. When the information of the current picture is received, information of the previous picture is already stored in the memory 11.

The LUT module 12 calculates a voltage value required to achieve a target response time of a TFT-LCD panel, with reference to a lookup table. In more detail, the LUT module 12 searches for voltage value information corresponding to a difference between the luminance value of a certain pixel of a currently received picture and the luminance value of the corresponding pixel of the previous picture stored in the memory 11, from the lookup table, and calculates a voltage value required to achieve the target response time of the TFT-LCD panel, using the voltage value information and information on the target response time of the TFT-LCD panel.

As described above, in order to calculate the voltage value required to achieve the target response time of the TFT-LCD panel, information of the previous picture must be stored in the memory 11. The higher the picture quality, the larger the amount of data of the picture. Accordingly, a variety of techniques for compression-storage of pictures in a memory have been proposed. Conventional image compression techniques include the JPEG (Joint Photographic Experts Group) standard, the H.264 (intra coding) standard, the JPEG-LS standard, etc. However, these standards exhibit the following problems when they are applied to LCD DCC devices.

First, there is a picture quality problem that occurs. When image data is compressed to ½-⅓ the size of the original image data, according to any one of the above-mentioned image compression methods, no significant problems occur in view of objective picture quality, e.g., measured by a Peak Signal-to-Noise Ratio (PSNR). However, in the case of the JPEG or H.264 standard based on transform coding, subjective picture quality performance deteriorates. In particular, based on a phenomenon in which the edge portion of an image appears crushed, a subjective interpretation of video quality may be that picture quality has deteriorated along the edge portions. Since LCD DCC devices drive a TFT-LCD channel that is to be shown directly to people, such subjective picture quality tends to be more important than objective picture quality in compression codecs for LCD DCC. That is, the compression codecs for LCD DCC devices typically should provide high picture quality performance so that people should not recognize the difference between images that have undergone image compression.

Another problem related to transform coding compression occurs when images shift in units of a pixel, e.g., with an object within the image moving, thereby shifting pixel values among neighboring pixels. Though there may be no apparent difference between an original image and its reconstructed image when the original image is shifted in a unit of each pixel, when an original image is transform coding compressed and reconstructed, a slight difference between pixel values within the same particular block has substantial influence on the reconstructed image. Accordingly, when an image is input to an LCD DCC device and shifted in a unit of a pixel, even a slight difference between pixel values will be easily recognized by users.

Second, since all of the above-mentioned image compression techniques are based on entropy coding, a critical path is created when images are decoded, and accordingly the complexity of a decoder significantly increases. Here, "critical path" means the longest process path among process paths that must be concurrently performed to complete all required processes. That is, "critical path" means a path requiring the longest process time among all processes currently being performed. In particular, in the case of the JPEG and H.264 standards that perform transform coding in a unit of a block, the complexity of a decoder further increases. Furthermore, since the H.264 standard uses intra prediction, the amount of memory use increases and the complexity of a decoder further increases.

Third, all of the above-mentioned image compression techniques allow bit rate control to some degree, however, they cannot generate an exact bit rate. For example, when the above-mentioned image compression techniques control a bit rate to achieve 1/3 compression, the bit rate will be limited within 1/3 compression due to the capacity limitation of a memory used in the corresponding LCD DCC device. For example, if bit rate control is successfully performed according to one of the above-mentioned image compression techniques, the data is compressed to less than 1/3 of the original amount. However, if bit rate control fails, the data cannot be compressed to less than 1/3 of the original amount. Therefore, the above-mentioned techniques are riot suitable for image compression for LCD DCC devices which use a fixed capacity of a memory.

SUMMARY

One or more embodiments of the present invention provides a system, medium, and method enhancing subjective picture quality, thereby significantly lowering the complexity of an image encoder/decoder system, and providing a picture-based Control Bit Rate (CBR) suitable for a Liquid Crystal Display Dynamic Capacitance Compensation (LCD DCC) device, when images are reconstructed.

Additional aspects and/or advantages will be set forth in part in the description which follows and, in part, will be apparent from the description, or may be learned by practice of the invention.

To achieve the above and/or other aspects and advantages, embodiments of the present invention include a data compression method, including selecting a compression mode, from among a plurality of compression modes to selectively differently compress components of a data, so that a select compressed data, from a plurality of respective corresponding compressions of the data according to the plurality of compression modes, is represented by predetermined fixed lengths of bits, and outputting the select compressed data.

To achieve the above and/or other aspects and advantages, embodiments of the present invention include a system with data compression, including a selection unit to select a compression mode, from among a plurality of compression modes to selectively differently compress components of a data, so that a select compressed data, from a plurality of respective corresponding compressions of the data according to the plurality of compression modes, is represented by predetermined fixed lengths of bits, and a bit packeting unit to output the select compressed data.

To achieve the above and/or other aspects and advantages, embodiments of the present invention include a data reconstruction method for reconstructing a current data from compressed current data represented by predetermined fixed lengths of bits, including recognizing a compression mode, from among a plurality of predetermined compression modes to selectively differently compress components of the current data, from the compressed current data as a corresponding compression of the current data, and reconstructing the current data from the compressed current data based on the recognized compression mode by selectively performing one of adding the compressed current data to reference data and adding a predetermined binary value to the compressed current data.

To achieve the above and/or other aspects and advantages, embodiments of the present invention include system with data reconstruction, to reconstruct a current data from compressed current data represented by predetermined fixed lengths of bits, the system including a recognition unit to recognize a compression mode, from among a plurality of predetermined compression modes to selectively differently compress components of the current data, from the compressed current data as a corresponding compression of the current data, and a decoding unit to reconstruct and output the current data from the compressed current data based on the recognized compression mode by selectively performing one of adding the compressed current data to reference data and adding a predetermined binary value to the compressed current data.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 illustrates pixels to which the prediction directions illustrated in FIG. 7 are applied;

FIG. 9 is a table that lists modes used by a DPCM/PCM encoding unit 63 illustrated in FIG. 6, according to an embodiment of the present invention;

FIG. 10 is a view for explaining a zero mode in which a data compression system, such as that illustrated in FIG. 6, compresses data without shifting the bits of any color components, according to an embodiment of the present invention;

FIG. 11 is a view for explaining a first mode in which a data compression system, such as that illustrated in FIG. 6, compresses data after shifting R and B color components by 1 bit each without shifting a G color component, according to an embodiment of the present invention;

FIG. 14 is a view for explaining a fourth mode in which a data compression system, such as that illustrated in FIG. 6, compresses data after shifting all color components by 2 bits each, according to an embodiment of the present invention;

FIG. 15 is a view for explaining a fifth mode in which a data compression system, such as that illustrated in FIG. 6, compresses data after shifting a G color component by 2 bits and shifting R and B color components by 3 bits each, according to an embodiment of the present invention;

FIG. 17 is a view for explaining a seventh mode in which a data compression system, such as that illustrated in FIG. 6, compresses data after shifting a G color component by 3 bits and shifting R and B color components by 4 bits each, according to an embodiment of the present invention;

DETAILED DESCRIPTION OF THE EMBODIMENTS

Figure 1:
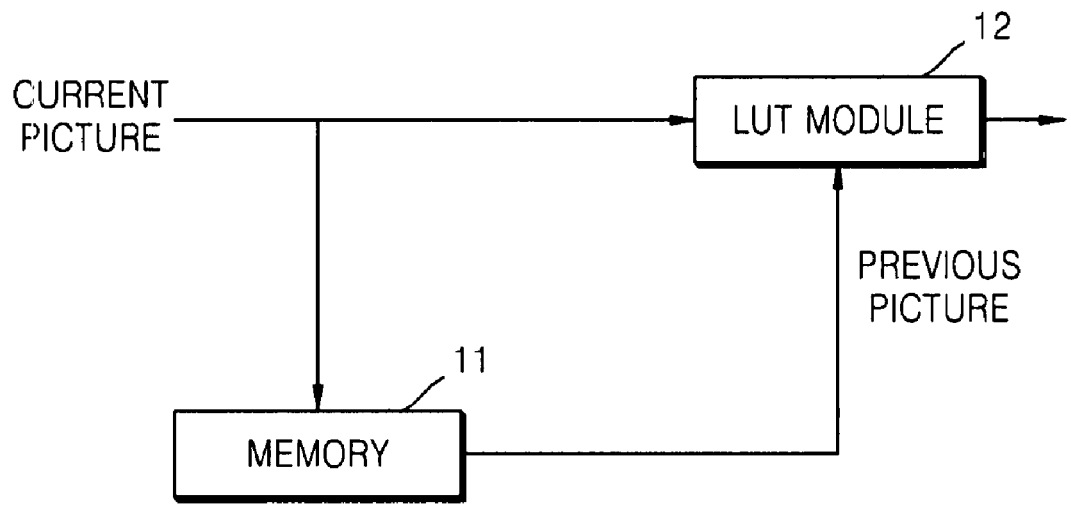
FIG. 1 illustrates a portion of a conventional Liquid Crystal Display Dynamic Capacitance Compensation (LCD DCC) device.

Reference will now be made in detail to embodiments, examples of which are illustrated in the accompanying drawings, wherein like reference numerals refer to the like elements throughout. Embodiments are described below to explain the present invention by referring to the figures.

Figure 2:
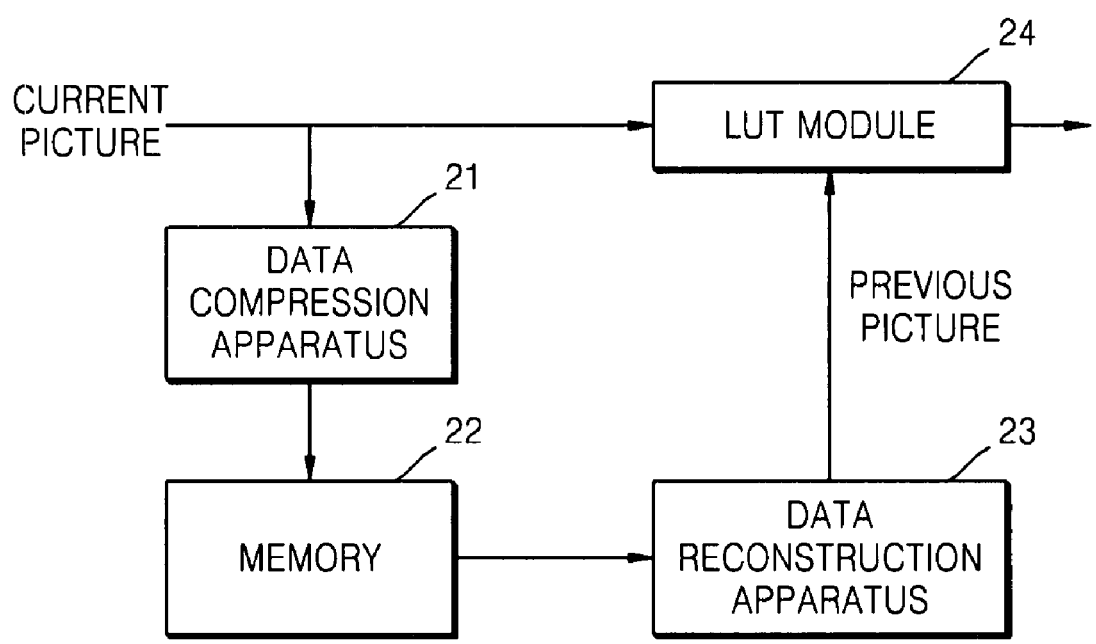
FIG. 2 illustrates a portion of a LCD DCC device/system, according to an embodiment of the present invention.

FIG. 2 illustrates a portion of a LCD DCC device/system, according to an embodiment of the present invention.

Referring to FIG. 2, the LCD DCC device may include a data compression system 21, a memory 22, a data reconstruction system 23, and a LUT module 24, for example.

The data compression system 21 may compress data, e.g., using one of two data compression methods, that is, a Differential Pulse Code Modulation (DPCM) method and a Pulse Code Modulation (PCM) method, for example.

The memory 22 may receive and store the compressed data from the data compression system 21. By performing this operation, when a current picture is received, the previous picture may already be stored in the memory 22.

The data reconstruction system 23 may reconstruct the compressed data using one of the two data compression methods, that is, the DPCM method and the PCM method, for example.

The LUT module 24 may calculate a voltage value required to achieve a target response time of a TFT-LCD panel, with reference to a lookup table. In more detail, the LUT module 24 may search the lookup table for voltage value information corresponding to a difference between the luminance value of a certain pixel in the currently received picture and the luminance value of the corresponding pixel in the previous picture, e.g., as reconstructed by the data reconstruction system 23, and calculate the voltage value required to achieve the target response time of the TFT-LCD panel, using the voltage value information and the target response time of the TFT-LCD panel.

Figure 3:
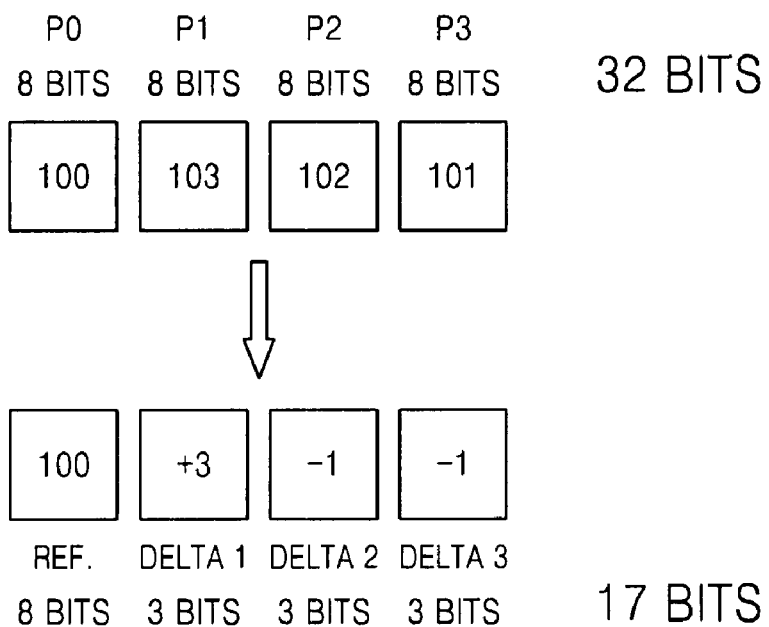
FIG. 3 is a view for explaining an example to which a Differential Pulse Code Modulation (DPCM) method performed by a data compression system, such as that illustrated in FIG. 2, is applied, according to an embodiment of the present invention.

FIG. 3 is a view for explaining an example in which a DPCM method is performed by the data compression system 21, for example.

Referring to FIG. 3, the data compression system 21 may calculate a difference between current image data and reference data, using the DPCM method, and compress the current image data based on the calculated difference. In particular, in the example illustrated in FIG. 3, 32 bits corresponding to 4 pixels are compressed to 17 bits.

Figure 4:
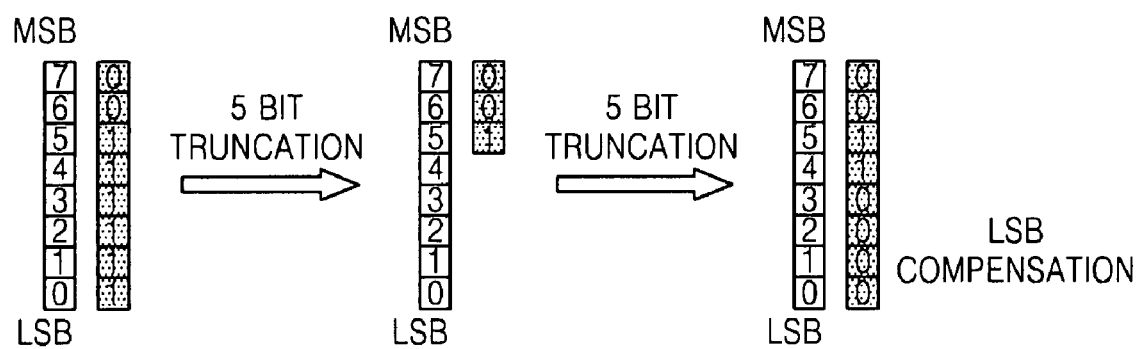
FIG. 4 is a view for explaining an example to which a Pulse Code Modulation (PCM) method performed by a data compression system, such as that illustrated in FIG. 2, is applied, according to an embodiment of the present invention.

FIG. 4 is a view for explaining an example in which a PCM method is performed by the data compression system 21, for example.

Referring to FIG. 4, the data compression system 21 may merely truncate a portion of current image data, using the PCM method, to compress the current image data. In particular, in the example illustrated in FIG. 4, the 5 lowest significant bits of original data 63 (00111111) are truncated. As an example, 5 bits of "10000" may later be added back when the original data is reconstructed, so that data representing a value of 56 (00110000) is reconstructed in place of the original data 63 (00111111). Herein, the term "PCM method" is used to explain a technical concept that is different from the "DPCM" method, and may also, for example, further be different from the technical concept of a typical PCM method of converting analog signals into digital signals. Thus, alternative terms can be used for this PCM method described herein, e.g., a truncation compression method, noting that alternatives are equally available.

From the above descriptions, it should be understood that the DPCM and PCM methods, which may be used by the data compression system 21 and the data reconstruction system 23, for example, can have very low complexity compared to conventional image compression methods, such as JPEG, H.264, and JPEG-LS standards. In particular, in an embodiment, by using the DPCM and PCM methods, for example, data can be easily compressed at a constant amount. According to one embodiment, a bit rate required by LCD DCC devices/systems can be exactly achieved.

Figure 5:
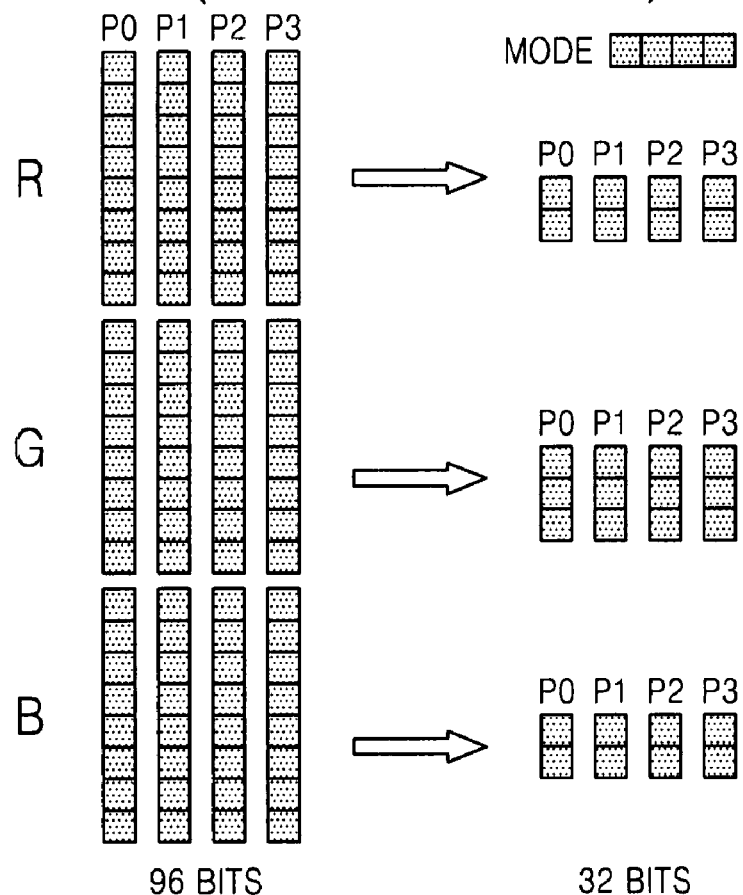
FIG. 5 illustrates a data format compressed by the a compression system, such as that illustrated in FIG. 2, according to an embodiment of the present invention.

FIG. 5 illustrates a data format compressed by a data compression system, such as system 21 illustrated in FIG. 2, according to an embodiment of the present invention. Below, and further herein, the reference to the data compression system 21 is used only as an example, and alternative data compression systems are equally available.

Referring to FIG. 5, the data compression system 21 may 1/3 compresses 96 bits of image data, for example, corresponding to a 2×2 size pixel block (hereinafter, simply referred to as a "2×2 block") made up of 4 pixels P0, P1, P2, and P3, thereby generating 32 bits of compressed data. Here, each pixel of the 2×2 block includes 8 bits of current image data corresponding to a Red (R) component, 8 bits of current image data corresponding to a Green (G) component, and 8 bits of current image data corresponding to a Blue (B) component, for example. Accordingly, in this example, each pixel data is originally represented by 24 bits, and the overall 2×2 block is represented by 96 bits.

The data compression system 21 may compress the 2×2 block to 4 bits of mode data and 28 bits of compressed data, for example. In more detail, in this example, 2 bits may be assigned to the 8 bits corresponding to the R component of each pixel, 3 bits may be assigned to the 8 bits corresponding to the G component of each pixel, and 2 bits may be assigned to the 8 bits corresponding to the B component of each pixel, again noting that alternative embodiments are equally available. In an embodiment, in order to achieve an exact 1/3 compression rate of 96 bits, 4 bits can be assigned to the mode data of each 2×2 block, 3 bits assigned to the G component of each pixel of the block, and 2 bits assigned to each of the R and B components of each pixel of the block.

As described above, in this embodiment, since the DPCM or PCM compression methods are being used with 2×2 blocks, it is possible to minimize picture quality deterioration when images shift, compared to conventional image compression methods where images are compressed in units of 16×16 macroblocks or 8×8 blocks. That is, since this embodiment compresses and/or reconstructs images in units of very small pieces, e.g., the 2×2 blocks, compared to the conventional methods, a slight difference between the values of pixels which appears in a certain block does little to substantially influence the subjective observable result obtained by compressing and reconstructing the corresponding image. Accordingly, this embodiment can significantly enhance subjective picture quality performance.

Embodiments of the present invention can be widely applied to image compression fields requiring low complexity and subjective lossless picture quality, other than the above-mentioned LCD DCC device/system illustrated in FIG. 2. For example, embodiments may be applied to image compression for Display Driver IC (DDI), reference picture compression of an image encoder/decoder system, or the like.

Figure 6:
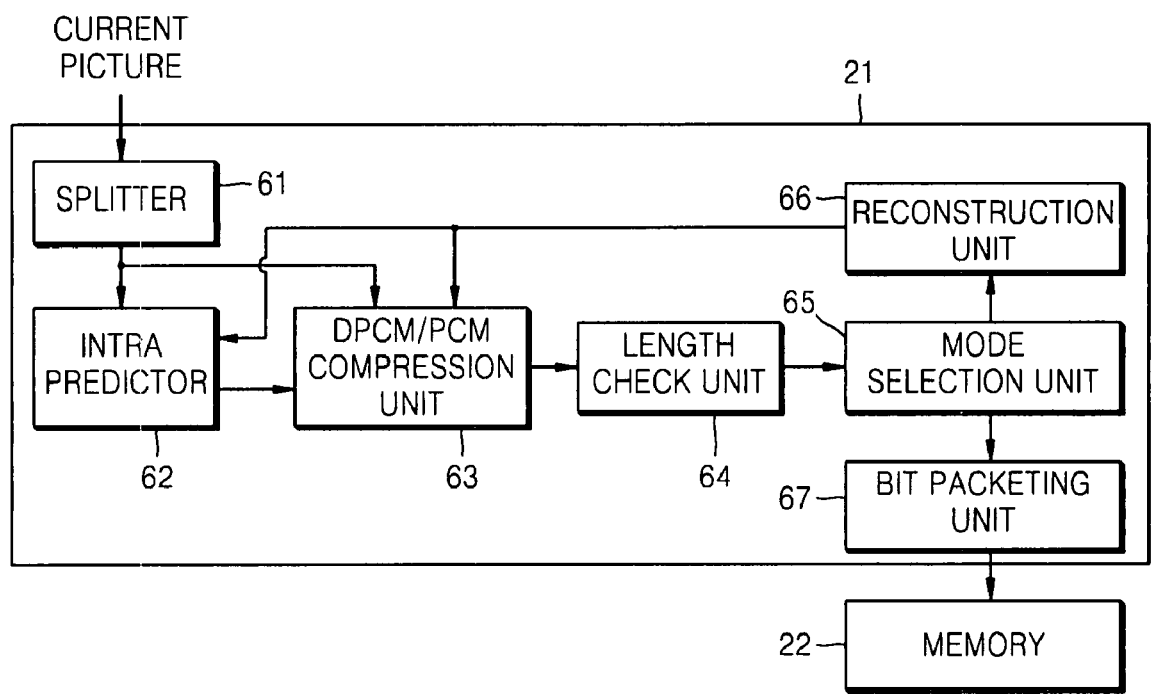
FIG. 6 illustrates a data compression system, such as that illustrated in FIG. 2, according to an embodiment of the present invention.

FIG. 6 illustrates a data compression system 21, such as that illustrated in FIG. 2, according to an embodiment of the present invention.

Referring to FIG. 6, the data compression system 21 may include a splitter 61, an intra prediction unit 62, a DPCM/PCM encoder 63, a length check unit 64, a mode selection unit 65, a reconstruction unit 66, and a bit packeting unit 67, for example.

The splitter 61 may receive a current picture, divide the current picture in units of 2×2 blocks, e.g., as illustrated in FIG. 5, and output at least one divided 2×2 blocks to the intra prediction unit 62.

The intra prediction unit 62 may calculate pixel value differences between each of 4 pixels forming each 2×2 block and its neighboring pixels that are respectively positioned in four prediction directions of the pixel. In addition, in an embodiment, the intra prediction unit 62 may determine the prediction direction corresponding to a minimum value of the pixel value differences.

Figure 7:
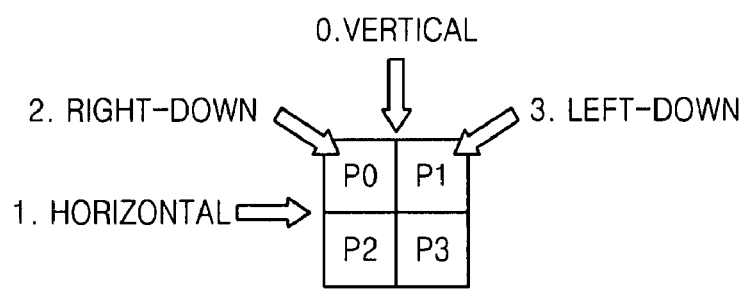
FIG. 7 illustrates prediction directions used by an intra prediction unit, such as that illustrated in FIG. 6, according to an embodiment of the present invention.

FIG. 7 illustrates example prediction directions that may be used by the intra prediction unit 62.

Referring to FIG. 7, the intra prediction unit 62, for example, may calculate a pixel value difference between a certain pixel and its neighboring pixel, e.g., positioned in a direction among the vertical, horizontal, right-down, and left-down directions of the pixel. In particular, as illustrated in FIG. 7, a value indicating the vertical direction may be set to "0", a value indicating the horizontal direction may be set to "1", a value indicating the right-down direction may be set to "2", and a value indicating the left-down direction may be set to "3". Thus, in such an embodiment, the intra prediction unit 62 can represent values indicating the four prediction directions through 2 bits of binary data. Thus, the intra prediction unit 62 may output 2 bits of binary data representing the prediction direction corresponding to the minimum value of the pixel value differences, e.g., to the DPCM/PCM encoder 63.

FIG. 8 illustrates example pixels to which such prediction directions illustrated in FIG. 7 may be applied.

Referring to FIG. 8, the intra prediction unit 62, for example, may calculate corresponding differences D0, D1, D2, and D3 in vertical directions between pixels P0, P1, P2, and P3 and pixels N3, N4, P0, and P1, located in a vertical direction to the pixels P0, P1, P2, and P3, respectively, as follows.

$D0=P0-N3$ $D1=P1-N4$ $D2=P2-P0$ $D3=P3-P1$

Further, the intra prediction unit 62, for example, may calculate corresponding differences D0, D1, D2, and D3 in horizontal directions between the pixels P0, P1, P2, and P3 and pixels N1, P0, N0, and P2, located in a horizontal direction to the pixels P0, P1, P2, and P3, respectively, as follows.

$D0=P0-N1$ $D1=P1-P0$ $D2=P2-N0$ $D3=P3-P2$

Further, the intra prediction unit 62, for example, may calculate corresponding differences D0, D1, D2, and D3 in right-down directions between the pixels P0, P1, P2, and P3 and pixels N2, N3, N1, and P0, located in an lower right direction to the P0, P1, P2, and P3, respectively, as follows.

$D0=P0-N2$ $D1=P1-N3$ $D2=P2-N1$ $D3=P3-P0$

Still further, the intra prediction unit 62, for example, may calculate corresponding differences D0, D1, D2, and D3 in left-down directions between the pixels P0, P1, P2, and P3 and pixels N4, N5, P1, and N6, located in a lower left direction to the pixels P0, P1, P2, and P3, respectively, as follow.

$D0=P0-N4$ $D1=P1-N5$ $D2=P2-P1$ $D3=P3-N6$

The DPCM/PCM encoder 63 may, thus, compress current image data received from the splitter 61, using the DPCM or PCM method, according to a plurality of modes for compressing 8 bits of current image data corresponding to the respective R, G, and B components of each of 4 pixels which form a 2×2 block received from the splitter 61. That is, the DPCM/PCM encoder 63 may calculate differences between 8 bits of current image data corresponding to the respective R, G, and B components of a certain pixel, and reference image data corresponding to the respective R, G, and B components of a neighboring pixel positioned in the prediction direction decided by the intra prediction unit 62, for example, according to some modes of the plurality of modes. In addition, the DPCM/PCM encoder 63 may truncate a portion of the 8 bits of current image data corresponding to the respective R, G, and B components of the pixel, and thereby compresses the current image data, also according to particular modes. Here, the reference image data may be data reconstructed by the reconstruction unit 66, for example, though the reference image data may be original data, noting that alternatives are also available.

Thus, in an embodiment, the DPCM/PCM encoder 63 may compress the current image data by, e.g., in parallel, calculating differences between the current image data and the reference image data and truncating the current image data in the plurality of modes. This operation may accomplish a compressing of current image data at high speed by concurrently performing operations of the respective modes. However, in this regards, it should be understood that a method of at least sequentially performing the operations of the respective modes may also be easily implemented, again noting that alternatives are also available.

FIG. 9 is a table listing example modes that may be used by a DPCM/PCM encoding unit 63, such as that illustrated in FIG. 6, according to an embodiment of the present invention.

Referring to FIG. 9, the DPCM/PCM encoder 63 may use a DPCM method, e.g., in particular modes 0 through 10, e.g., among 12 example modes, and then use a PCM method in a mode 11. As described above, in one embodiment, since 4 bits are assigned to mode data, 4 additional modes may be used.

In particular, in an embodiment, when a DPCM method is used, the DPCM/PCM encoder may 63 may selectively shift 8 bits of current image data and 8 bits of reference image data in a right direction by a predetermined number of bits depending on which of the example modes 0 through 10 is implemented, and calculate differences between the selectively shifted 8 bits of current image data and the corresponding selectively shifted 8 bits of reference image data. In this embodiment, shifting the bits of current image data and the bits of reference image data by 1 bit in a right direction means shifting the image data 1 bit in the direction of its Least Significant Bit (LSB). Accordingly, such 1-bit shifting is equivalent to dividing the 8 bits of current image data and the 8 bits of reference image data by 2, respectively. Hereinafter, a method in which the DPCM/PCM encoder 63 compresses current data in each of the example modes 0 through 10 will be described in greater detail.

FIG. 10 is a view for explaining a mode 0 in which a data compression system 21, such as that illustrated in FIG. 6, compresses data without shifting bits of any color components.

Referring to FIGS. 6 and 10, the DPCM/PCM encoder 63 may calculate a difference between 8 bits of current image data corresponding to the G component of a pixel, e.g., among 4 pixels which form a 2×2 block received from the splitter 61, and 8 bits of reference image data corresponding to the G component of a neighboring pixel, e.g., positioned in a prediction direction decided by the intra prediction unit 62. Particularly, in an embodiment, in the case of the G component, mode 0 may be used if the difference is in a range of −4 to 3, as the difference can be represented by 3 bits as illustrated in FIG. 10, and no error would be generated between the original data and its reconstructed data since no bits of the original data are ignored.

Similarly, the DPCM/PCM encoder 63 may process the R and B components of the pixel in the same way as the processing of the G component. In particular, in an embodiment, in the case of the R and B components, this mode 0 may be used if the corresponding difference is in a range of −2 to 1, as the difference could be represented by 2 bits, e.g., as illustrated in FIG. 2, and no error would be generated between the original data and its reconstructed data since no bits of the original data are ignored. The DPCM/PCM encoder 63 may process the remaining pixels in the same way.

FIG. 11 is a view for explaining a mode 1 in which a data compression system 21, such as that illustrated in FIG. 6, compresses data after shifting R and B color components respectively by 1 bit and without shifting a G color component.

Referring to FIG. 11, the DPCM/PCM encoder 63 may calculate a difference between 8 bits of current data corresponding to the G component of a pixel, e.g., among 4 pixels which form a 2×2 block received from the splitter 61, and 8 bits of reference image data corresponding to the G component of a neighboring pixel, e.g., positioned in a prediction direction decided by the intra prediction unit 62. Thus, in this embodiment, the DPCM/PCM encoder 63 may shift bits of current image data corresponding to the R component of the pixel and bits of reference image data corresponding to the R component of the neighboring pixel, positioned in the prediction direction decided by the intra prediction 62, respectively, by 1 bit, and then calculate a difference between the shifted 8 bits of current image data and the shifted 8 bits of reference image data. In addition, the DPCM/PCM encoder 63 may process the B component of the pixel in the same way.

Here, since the R and B components are shifted by 1 bit, this mode 1 may be used if the difference is in a range of −4 to 3, as the difference may be represented by 2 bits, as illustrated in FIG. 10. In addition, since 1 bit of original data is ignored, a maximum error which can be generated between the original data and its restored data becomes "1", if the ignored 1 bit is restored to "1". The DPCM/PCM encoder 63 may further process the remaining 3 pixels, except for the pixel which has just been processed in the same way.

Figure 12:
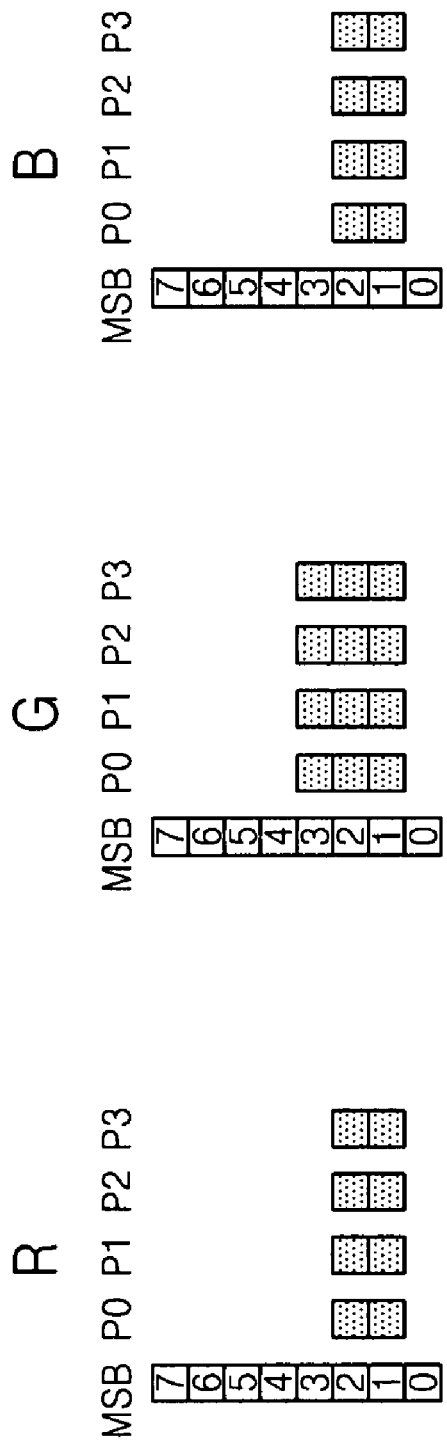
FIG. 12 is a view for explaining a second mode in which a data compression system, such as that illustrated in FIG. 6, compresses data after shifting all color components by 1 bit each, according to an embodiment of the present invention.

FIG. 12 is a view for explaining a mode 2 in which the data compression system 21, such as that illustrated in FIG. 6, compresses data after shifting all color components respectively by 1 bit.

Referring to FIG. 12, the DPCM/PCM encoder 63 may shift bits of current image data corresponding to the G component of a pixel, e.g., among 4 pixels which form a 2×2 block received from the splitter 61, and bits of reference image data corresponding to the G component of a neighboring pixel, e.g., positioned in a prediction direction decided by the intra prediction 62, respectively, by 1 bit, and calculate a difference between the 8 bits of current image data shifted by 1 bit and the 8 bits of reference image data shifted by 1 bit.

In particular, here, since the G component is shifted by 1 bit, this mode 2 may be used if the difference is in a range of −8 to 7, as the difference can be represented by 3 bits, as illustrated in FIG. 10. Since 1 bit of original data is ignored, a maximum error value which can be generated between the original data and its reconstructed data becomes "1", since the ignored 1 bit is restored to "1". The DPCM/PCM encoder 63 may process the R and B components of the pixel in the same way. Further, the DPCM/PCM encoder 63 may process the remaining 3 pixels in the same way.

Figure 13:
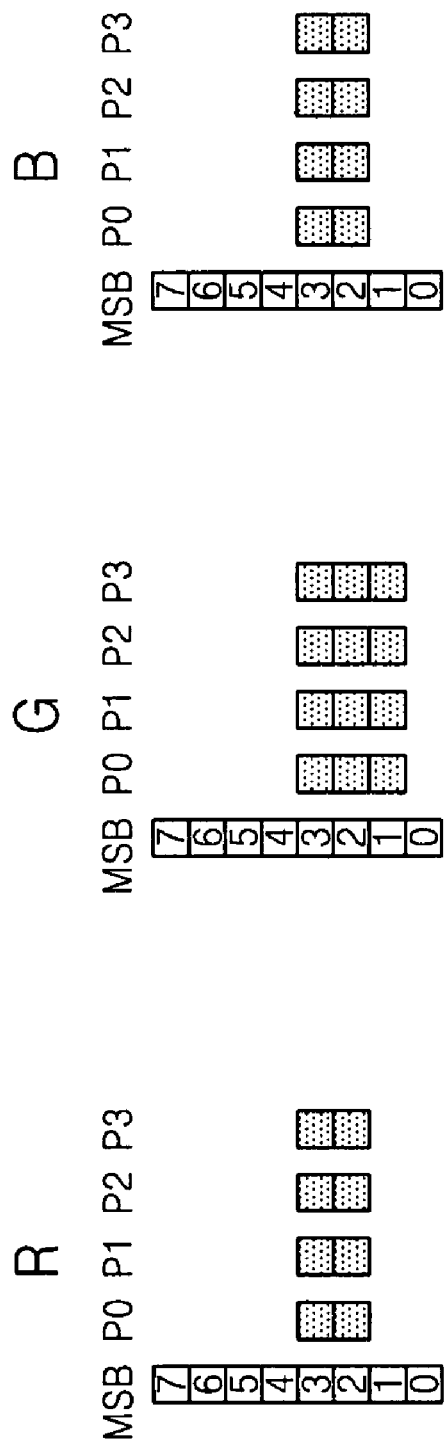
FIG. 13 is a view for explaining a third mode in which a data compression system, such as that illustrated in FIG. 6, compresses data after shifting a G color component by 1 bit and shifting R and B color components by 2 bits each, according to an embodiment of the present invention.

FIG. 13 is a view for explaining a mode 3 in which the data compression system 21, such as that illustrated in FIG. 6, compresses data after shifting a G color component by 1 bit and shifting R and B color components by 2 bits each.

FIG. 14 is a view for explaining a mode 4 in which the data compression system 21, such as that illustrated in FIG., 6 compresses data after shifting all color components by 2 bits each.

FIG. 15 is a view for explaining a mode 5 in which the data compression system 21, such as that illustrated in FIG. 6, compresses data after shifting a G color component by 2 bits and shifting R and B color components by 3 bits each.

Figure 16:
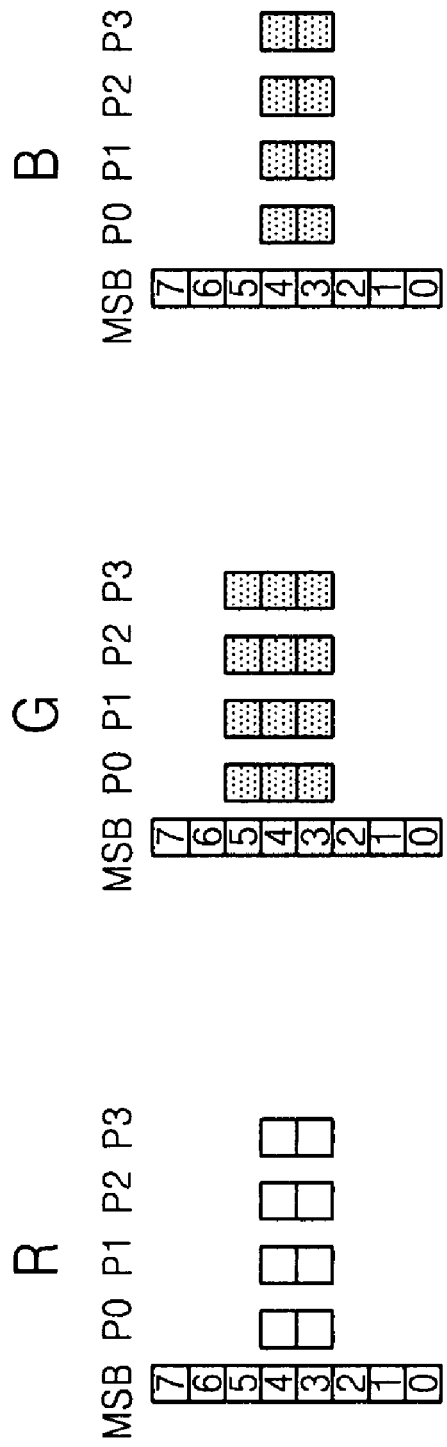
FIG. 16 is a view for explaining a sixth mode in which a data compression system, such as that illustrated in FIG. 6, compresses data after shifting all color components by 3 bits each, according to an embodiment of the present invention.

FIG. 16 is a view for explaining a mode 6 in which the data compression system 21, such as that illustrated in FIG. 6, compresses data after shifting all color components by 3 bits each.

FIG. 17 is a view for explaining a mode 7 in which the data compression system 21, such as that illustrated in FIG. 6, compresses data after shifting a G color component by 3 bits and shifting R and B color components by 4 bits each.

Figure 18:
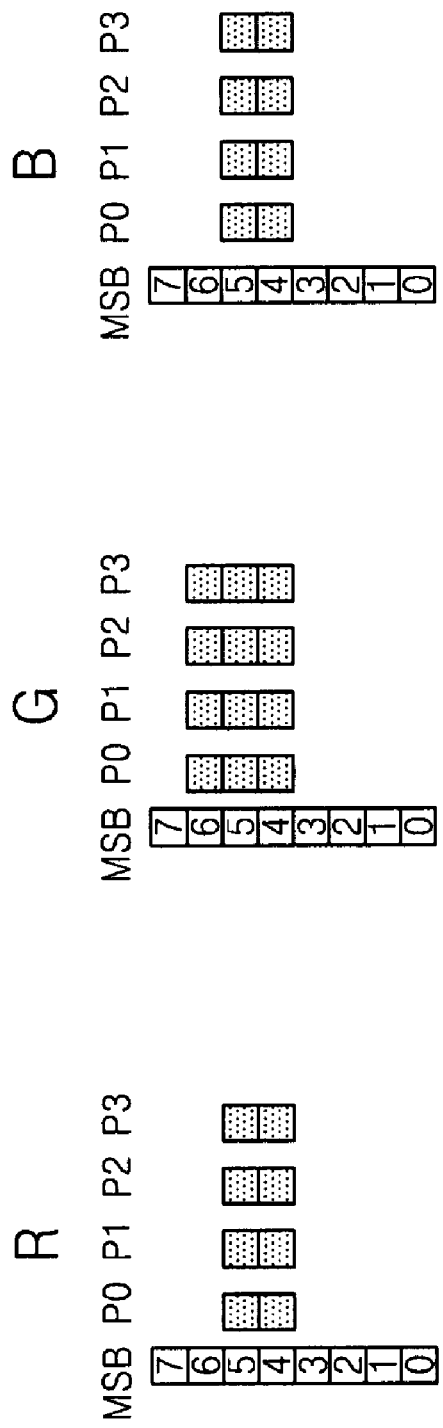
FIG. 18 is a view for explaining an eighth mode in which a data compression system, such as that illustrated in FIG. 6, compresses data after shifting all color components by 4 bits each, according to an embodiment of the present invention.

FIG. 18 is a view for explaining a mode 8 in which the data compression system 21, such as that illustrated in FIG. 6, compresses data after shifting all color components by 4 bits each.

Figure 19:
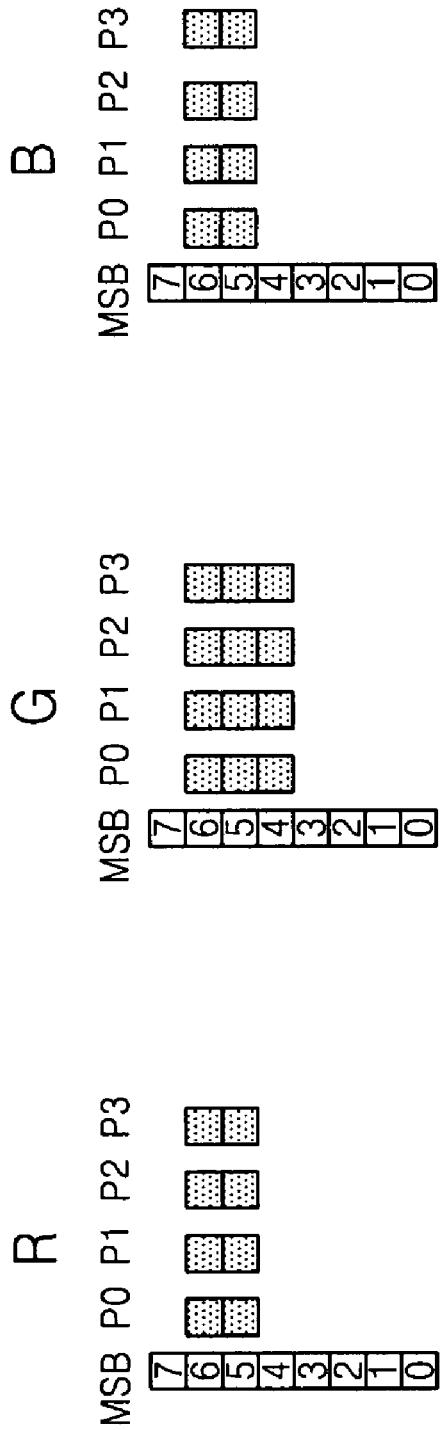
FIG. 19 is a view for explaining a ninth mode in which a data compression system, such as that illustrated in FIG. 6, compresses data after shifting a G color component by 4 bits and shifting R and B color components by 5 bits each, according to an embodiment of the present invention.

FIG. 19 is a view for explaining a mode 9 in which the data compression system 21, such as that illustrated in FIG. 6, compresses data after shifting a G color component by 4 bits and shifting R and B color components by 5 bits each.

Figure 20:
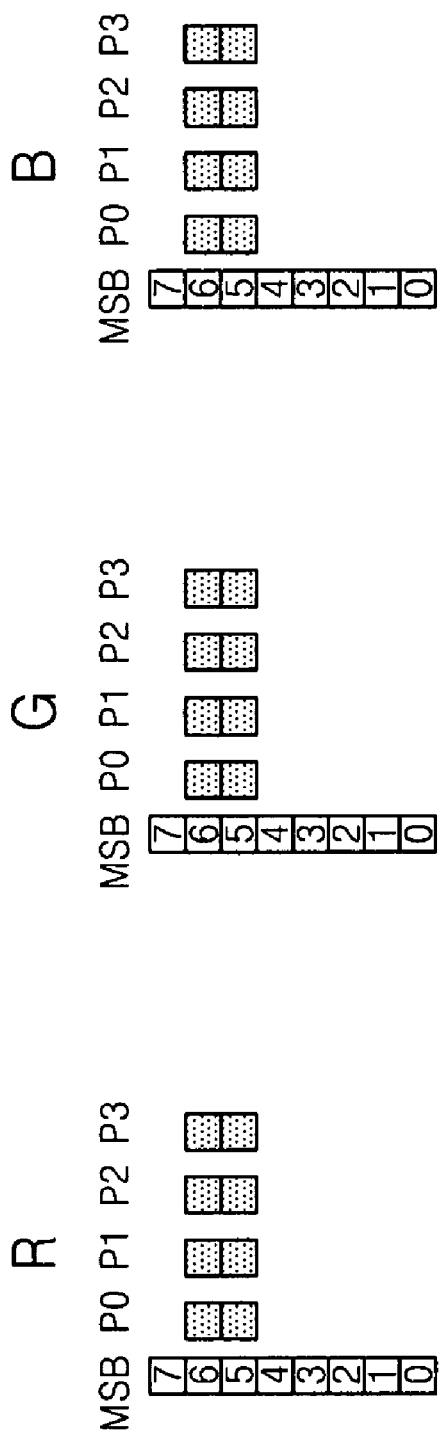
FIG. 20 is a view for explaining a tenth mode in which a data compression system, such as that illustrated in FIG. 6, compresses data after shifting all color components by 5 bits each, according to an embodiment of the present invention.

FIG. 20 is a view for explaining a mode 10 in which the data compression system 21, such as that illustrated in FIG. 6, compresses data after shifting all color components by 5 bits each.

Embodiments illustrated in FIGS. 13 through 20 have a similar technical concept as those of FIGS. 10 through 12, as described above, and although the numbers of bit shifting operations and modes are different from those of the embodiments illustrated in FIGS. 10 through 12, further detailed descriptions thereof will be omitted; the above description of FIGS. 10 and 12 can be used for understanding FIGS. 13-20. In addition, here, a maximum error value that can be generated between original data and its reconstructed data may be calculated under the assumption that the MSBs of ignored bits of the original data are restored to "1" and the remaining bits of the ignored bits of the original data are restored to "0", noting that alternatives are equally available.

In an embodiment, the DPCM/PCM encoder 63 may truncate 5 bits of the example 8 bits of current image data corresponding to the G component, e.g., of a pixel among 4 pixels forming a 2×2 block received from the splitter 61, and thus compresses the current image data. Further, in an embodiment, the DPCM/PCM encoder 63 may truncate a maximum of 6 bits of the example 8 bits of current image data respectively corresponding to the R and B components of the pixel, and thus compresses the current image data. Here, the DPCM/PCM encoder 63 may process the remaining 3 pixels in the same way. Here, these embodiments fall under the described mode 11.

In one embodiment, the length check unit 64 may determine whether the difference calculated by the DPCM/PCM encoder 63, e.g., in the respective 11 modes according to the DPCM method, can be represented by a fixed length of bits. That is, here, the length check unit 64 may determine whether the difference between the 8 bits of current image data corresponding to the G component of the pixel and the 8 bits of reference image data can be represented by 3 bits, and whether the difference between the 8 bits of current image data corresponding to each of the R and B components of the pixel and the 8 bits of current image data corresponding to each of the R and B components of the pixel can be represented by 2 bits, for example.

For example, the length check unit 64 may process the difference calculated in mode 0 illustrated in FIG. 10, for example. That is, mode 0 may be used if the difference between the 8 bits of current image data corresponding to the G component and the 8 bits of reference image data corresponding to the G component, without bit shifting, is within a range of −4 to 3, and then the length check unit 64 may determine that the difference can be represented by 3 bits. Similarly, in such an example, if the difference between the 8 bits of current image data corresponding to the R component and the 8 bits of reference image data corresponding to the R component is within a range of −2 to 1, the length check unit 64 may determine that the difference can be represented by 2 bits, and, if the difference value between the 8 bits of current image data corresponding to the B component and the 8 bits of reference image data corresponding to the B component is within a range of −2 to 1, the length check unit 64 may determine that the difference can be represented by 2 bits.

Thus, the mode selection unit 65 may select an appropriate mode in which the maximum error value that can be generated between current image data and its reconstructed data is at a minimum, from among modes in which the difference can be represented by a fixed length of bits.

Here, in an embodiment, since maximum error values corresponding respectively to the R, G, and B components exist separately, the mode selection unit 65 may select the mode in which a sum of maximum error values corresponding respectively to the R, G, and B components is minimum.

Figure 21:
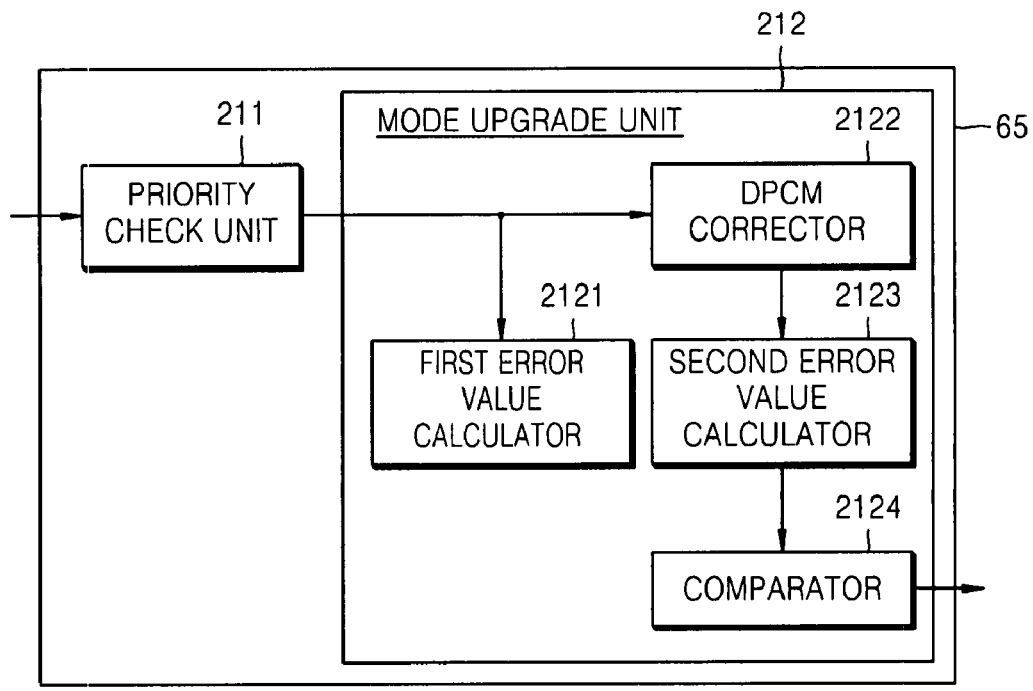
FIG. 21 illustrates a mode selection unit, such as that illustrated in FIG. 6, according to an embodiment of the present invention.

FIG. 21 illustrates a mode selection unit 65, such as that illustrated in FIG. 6, according to an embodiment of the present invention.

Referring to FIG. 21, the mode selection unit 65 may include a priority check unit 211 and a mode upgrade unit 212, for example.

Thus, in an embodiment, the priority check unit 211 may check priorities of the modes in which the difference can be represented by a fixed length of bits, as determined by the length check unit 64, and select the mode having the highest priority from among the modes. Here, the higher priority may be assigned to a mode when the maximum error value is least, that is, the priorities of the modes may correspond to the numbers of the modes. For example, the priority check unit 211 may identify modes 5 through 11 as where the difference can be represented by a fixed length of bits, e.g., as determined by the length check unit 64, and select mode 5 having the highest priority from among modes 5 through 11.

Referring to FIG. 21, the mode upgrade unit 212 may include a first error value calculator 2121, a DPCM corrector 2122, a second error value calculator 2123, and a comparator 2124, for example.

The first error value calculator 2121 may calculate a maximum error value based on the mode selected by the priority check unit 211. As only an example, if mode 5 is selected by the priority check unit 211, the first difference value calculator 2121 may calculate a sum 50 of maximum error values 16, 8, and 16 of R, G, and B components according to mode 5.

The DPCM corrector 2122 may further upgrade the current mode to a mode having a higher priority, e.g., by 1 level, compared to the mode selected by the priority check unit 211, and correct a portion of difference values according to the upgraded mode. In alternative embodiments, it should be understood that the DPCM corrector 2122 may, thus, upgrade the current mode to a mode having a priority higher by two or more levels, noting that alternatives are also available. As one example, if mode 5 is selected by the priority check unit 64, a difference between 8 bits of current image data corresponding to the G component of each of 4 pixels forming a 2×2 block, and 8 bits of reference image data corresponding to the G component may respectively be (10, 10, 10, 10), and a difference between 8 bits of current image data corresponding to each of the R and B components of each of the four pixels and 8 bits of reference image data corresponding to each of the R and B components may respectively be (7, 7, 8, 7), the DPCM corrector 2122 may upgrade the mode to mode 4 having a higher priority, e.g., by 1 level, compared to the originally selected fifth mode 5, and may change the difference represented by (7, 7, 8, 7) to the difference (7, 7, 7, 7), without changing the difference (10, 10, 10, 10) between the 8 bits of current image data and the 8 bits of reference image data corresponding to the G component.

The second error value calculator 2123 may calculate a maximum error value, e.g., according to the differences corrected by the DPCM corrector 2122. For example, the second difference value calculator 2123 may calculate a sum 25 maximum error values 8, 8, and 8, respectively of the R, G, and B components, according to mode 4, and an error value 1, e.g., according to the difference correction of the DPCM corrector 2122.

The comparator 2124 may, thus, compare the maximum error value calculated by the first error value calculator 2121, for example, with the maximum error value calculated by the second error value calculator 2123, also as an example, and select a mode having a smaller error value according to the result of the comparison. For example, if the maximum error value calculated by the first error value calculator 2121 is 50 and the maximum error value calculated by the second error value calculator 2123 is 25, the comparator 2124 may selects mode 4 for having the lower maximum error value of 25.

Thus, in an embodiment, the reconstruction unit 66 illustrated in FIG. 6, for example, may add compressed data corresponding to the R, G, and B components of a pixel among 4 pixels forming a 2×2 block, according to the mode selected by the mode selection unit 65, to reference image data corresponding to the R, G, and B components of a neighboring pixel which is positioned in a prediction direction decided by the intra prediction unit 62, or add a predetermined binary value to the compressed data corresponding to the R, G, and B components of the pixel, thereby reconstructing current image data corresponding to the R, G, and B components. Here, the operation of the reconstruction unit 66 may be similar to the data reconstruction system 23 illustrated in FIG. 22. Accordingly, a further detailed corresponding description for the reconstruction unit 66 is omitted in consideration to the following description related to the DPCP/PCM decoder 223.

In addition, in an embodiment, if reference image data is equal to original data, the reconstruction unit 66 can be omitted.

Returning again to FIG. 6, the bit packeting unit 67 may generate a total of 32 bits, for example, of a data packet having 28 bits of data compressed, according to a mode selected by the mode selection unit 65, and 4 bits of data indicating the mode selected by the mode selection unit 65, among data compressed respectively according to the 12 example modes by the DPCM/PCM encoder 63, and output the 32 bits of the data packet to the memory 22. Alternatively, the bit packeting unit 67 may generate a total of 34 bits of a data packet, for example, which further includes 2 bits of data indicating a prediction direction decided by the intra prediction unit 62, other than the 28 bits of compressed data and the 4 bits of mode data.

Figure 22:
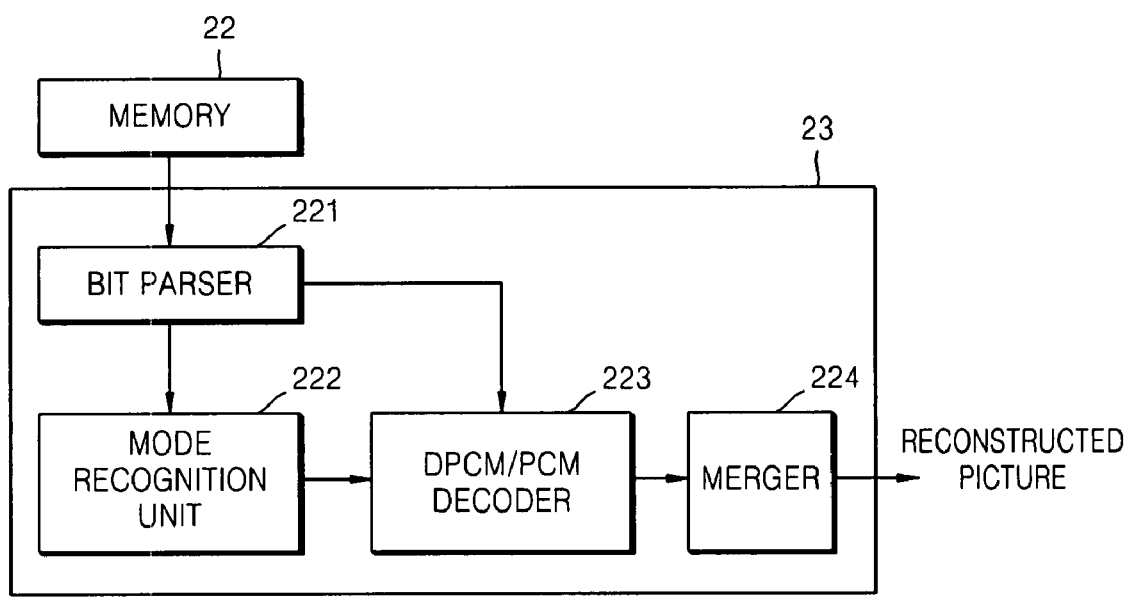
FIG. 22 illustrates a data reconstruction system, such as that illustrated in FIG. 2, according to an embodiment of the present invention.

Thus, FIG. 22 illustrates a data reconstruction system 23, such as that illustrated in FIG. 2, according to an embodiment of the present invention.

Referring to FIG. 22, the data reconstruction system 23 may include a bit parser 221, a mode recognition unit 222, a DPCM/PCM decoder 223, and a merger 224, for example.

The bit parser 221 may read the 32 bits of the data packet from the memory 22, for example, parse the 32 bits of the data packet, and extract 4 bits of mode data and 28 bits of compressed data from the 32 bits of the data packet. In addition, the bit parser 221 may further output the 4 bits of mode data to the mode recognition unit 222, and output the 28 bits of compressed data to the DPCM/PCM decoder 223. Alternatively, in another embodiment, the bit parser 221 may read the 34 bits of the data packet, for example, instead of the 32 bits of the data packet, from the memory 22, and extract 4 bits of mode data, 28 bits of compressed data, and 2 bits of predicted direction data from the 34 bits of the data packet. Still further, the bit parser 221 may output the 4 bits of mode data to the mode recognition unit 222, and output the 28 bits of compressed data and the 2 bits of predicted direction data to the DPCM/PCM decoder 223.

Here, the mode recognition unit 222 may recognize the mode that had been selected, e.g., by the data compression unit 21, among the 12 example modes for compressing current image data corresponding to a 2×2 block, from the 4 bits of mode data received from the bit parser 221, for example.

The DPCM/PCM decoder 223 may reconstruct 96 bits of a 2×2 block from 28 bits of compressed data received from the bit parser 221, according to the mode recognized by the mode recognition unit 222. In an embodiment, for example, if the mode recognized by the mode recognition unit 222 is one among modes 0 through 10, that is, if the mode recognized by the mode recognition unit 222 is a mode using the DPCM method, for example, the DPCM/PCM decoder 223 may shift compressed data corresponding to each of the R, B, and G components of a pixel received from the bit parser 221, by the number of bits corresponding to the mode recognized by the mode recognition unit 222, for 4 pixels forming a 2×2 block. Then, the DPCM/PCM decoder 223 may add a binary value corresponding to the mode recognized by the mode recognition unit 222, to the compressed data subjected to bit-shifting, thereby reconstructing differences between current image data corresponding to the R, B, and G components and reference image data corresponding to the R, B, and G components.

In particular, the DPCM/PCM decoder 223 may shift the compressed data in a left direction, e.g., opposite to the bit-shifting direction of when the current image data was compressed. Here, shifting 4 bits of compressed data in units of 1 bit means shifting the compressed data in the direction of its MSB. Accordingly, such a shifting of 1 bit is equivalent to multiplying the value of compressed data by 2. In addition, the DPCM/PCM decoder 223 may add the reconstructed difference value to 8 bits of reference data corresponding to the R, G, and B components of a neighboring pixel which is positioned in a prediction direction, e.g., indicated by the potential 2 bits of predicted direction data received from the bit parser 221, thereby reconstructing 8 bits of current image data corresponding to the R, G, and B components.

In an embodiment, if the mode recognized by the mode recognition unit 222 is mode 11, that is, if the mode recognized by the mode recognition unit 222 is a mode using the PCM method, for example, the DPCM/PCM decoder 223 may add 5 bits of a binary value to the 3 bits of compressed data corresponding to the G component among the 28 bits of compressed data received from the bit parser 221, and add 6 bits of a binary value to the 2 bits of compressed data corresponding to each of the R and B components among the 28 bits of compressed data, for 4 pixels forming a 2×2 block, thereby reconstructing 8 bits of current image data corresponding to each of the R, G, and B components.

Figure 23:
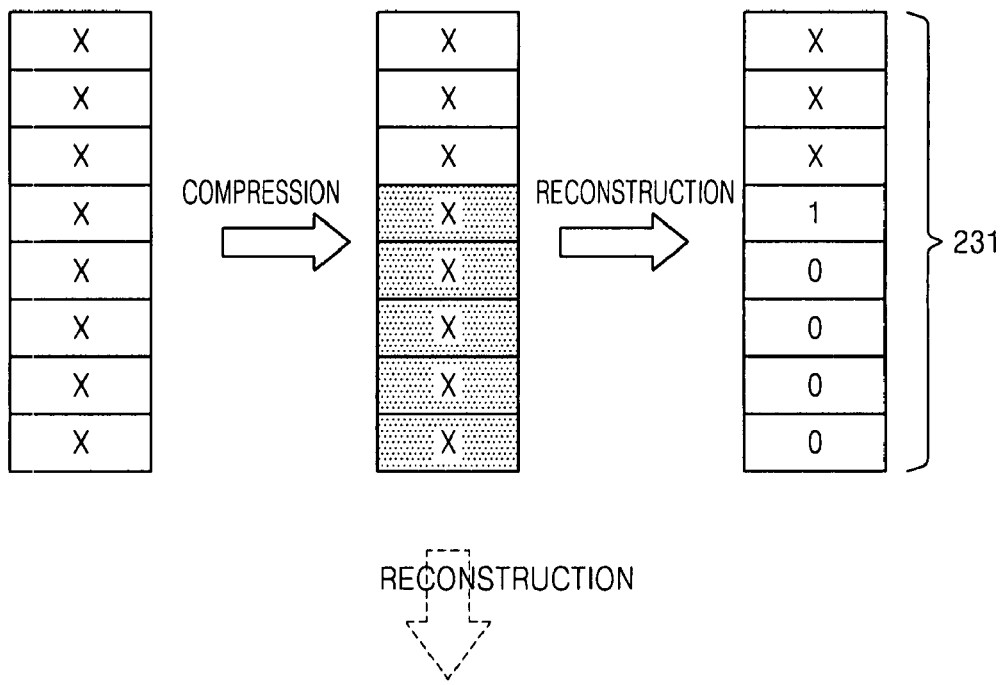
FIG. 23 is a view for explaining a process of reconstructing 3 bits of compressed data, e.g., by a DPCM/PCM decoding unit such as illustrated in FIG. 22, according to an embodiment of the present invention.

FIG. 23 is a view for explaining a process of reconstructing 3 bits of compressed data, e.g., by the DPCM/PCM decoder 223 illustrated in FIG. 22, according to an embodiment of the present invention.

As indicated by the illustrated portion 231 of FIG. 23, and in this example embodiment, the DPCM/PCM decoder 223 may basically assign "10000" to the 3 bits of compressed data corresponding to a G component, and assign "100000" to the 3 bits of compressed data corresponding to each of the R and B components. However, due to the characteristics of image data, if the 3 bits of compressed data corresponding to the G component is "111", its original image data will be a maximum value "1111111" or approach "1111111". If the 3 bits of compressed data corresponding to the G component is "000", its original image data will be a minimum value "00000000" or approach "00000000". Accordingly, if the 3 bits of compressed data is a maximum value, among values that can be represented by 3 bits, the DPCM/PCM decoder 223 may increases the binary value that is to be assigned to the compressed data by a predetermined size, and assign the increased binary value to the compressed data. That is, if the compressed data is a maximum value (that is, "111"), among values that can be represented by 3 bits, the DFCM/PCM decoder 223 may increase the binary value that is to be assigned to the compressed data by a predetermined size, and assign the increased binary value to the compressed data. In addition, if the compressed data is a minimum value (that is, "000"), among values that can be represented by 3 bits, the DPCM/PCM decoder 223 may decrease the binary value that is to be assigned to the compressed data by a predetermined size, and assign the decreased binary value to the compressed data.

As indicated by the illustrated portion 232 of FIG. 23, if the compressed data is the maximum value, the DPCM/PCM decoder 223 may increase the binary value that is to be assigned to the compressed data by a value corresponding to the amount of bit-shifting or truncation according to the mode recognized by the mode recognition unit 222, for example, and assign the increased binary value to the compressed data. Further, if the compressed data is the minimum value, the DPCM/PCM decoder 223 may decrease a binary value that is to be assigned to the compressed data by a value corresponding to the amount of bit-shifting or truncation according to the mode recognized by the mode recognition unit 222, for example, and assign the decreased binary value to the compressed data.

For example, in an embodiment, if the amount of bit-shifting or truncation, e.g., according to the mode recognized by the mode recognition unit 222, is 5 bits and the compressed data is "111", the DPCM/PCM decoder 223 may increase the binary value "10000" that is to be assigned to the compressed data by 4, and assign the increased binary value "10100" to the compressed data "111", thereby reconstructing current image data to "111 10100". In addition, if the amount of bit-shifting or truncation, e.g., according to a mode recognized by the mode recognition unit 222, is 5 bits and the compressed data is "000", the DPCM/PCM decoder 223 may decrease a binary value "10000" that is to be assigned to the compressed data by 4, and assign the decreased binary value "01100" to the compressed data "111", thereby reconstructing current image data to "000 01100".

The merger 224 may merge the resultant total of 96 bits of a 2×2 block and thus reconstruct the corresponding picture, wherein the 2×2 block is made up of 4 pixels, and each pixel includes R, G, B components having 8 bits of current image data, as respectively reconstructed by the DPCM/PCM decoder 223.

Figure 24:
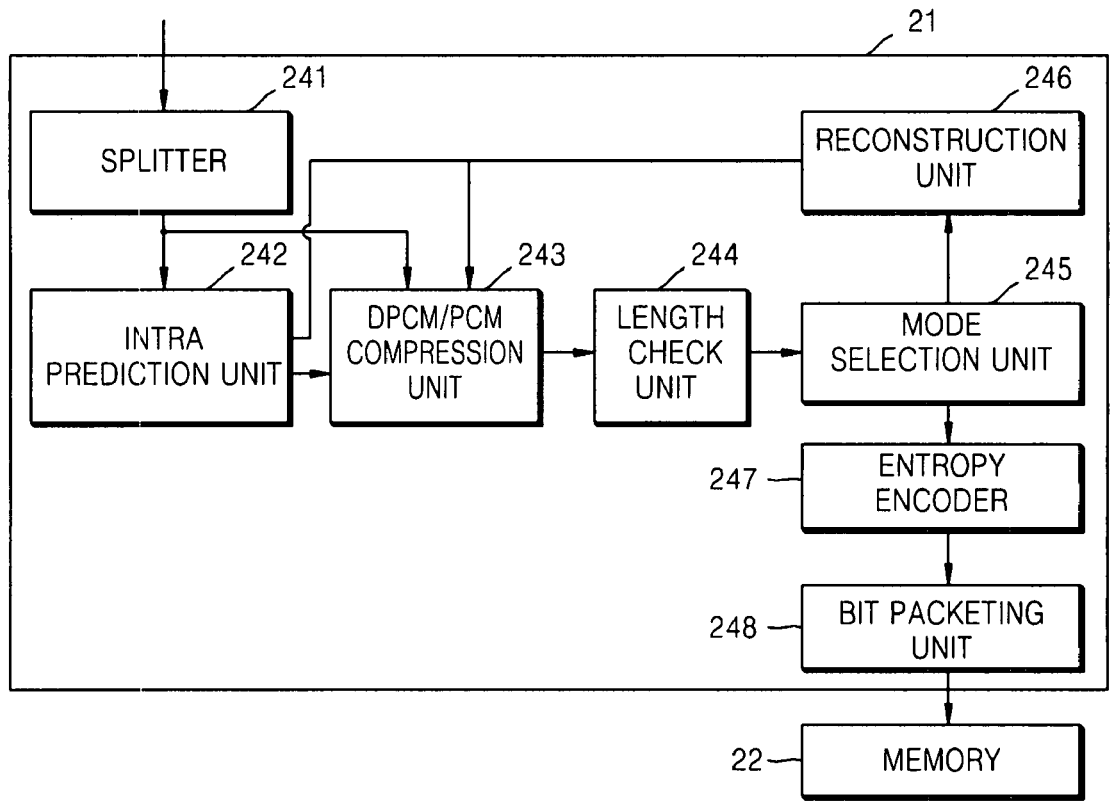
FIG. 24 illustrates a data compression system, such as illustrated in FIG. 2, according to another embodiment of the present invention.

FIG. 24 illustrates a data compression system 21, such as illustrated in FIG. 2, according to another embodiment of the present invention.

Referring to FIG. 24, the data compression system 21 may include a splitter 241, an intra prediction unit 242, a DPCM/PCM encoder 243, a length check unit 244, a mode selection unit 245, a reconstruction unit 246, an entropy encoder 247, and a bit packeting unit 248, for example. The data compression system 21 illustrated in FIG. 24 includes the entropy encoder 247, compared to the similar data compression system illustrated in FIG. 6. Accordingly, hereinafter, only the entropy encoder 247 will be further described. In addition, the bit packeting unit 248 may generate a data packet including the result of entropy-encoding by the entropy encoder 247.

The entropy encoder 247 may perform entropy-encoding on 32 bits of data having 28 bits of data compressed, e.g., according to the mode selected by the mode selection unit 65, and 4 bits of data indicating the mode selected by the mode selection unit 65, among data compressed according to the example 12 modes by the DPCM/PCM encoder 63. Otherwise, the entropy encoder 247 may perform entropy-encoding on 34 bits of data, which further includes 2 bits of data indicating the prediction direction decided by the intra prediction unit 242, for example, other than the 28 bits of compressed data and the 4 bits of mode data. Here, entropy-encoding means an encoding method of assigning codes to symbols so that the probabilities of the symbols are matched to the lengths of the codes. Representative entropy encoding techniques include Huffman coding, Arithmetic coding, etc.

Figure 25:
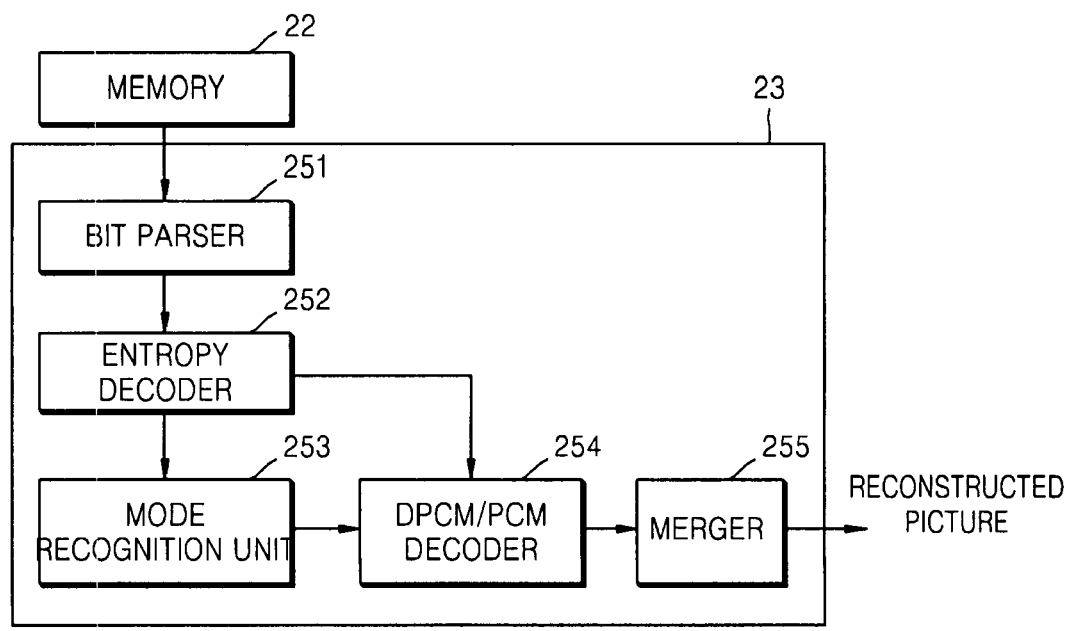
FIG. 25 illustrates a data reconstruction system, such as illustrated in FIG. 2, according to another embodiment of the present invention.

FIG. 25 illustrates a data reconstruction system 23, such as that illustrated in FIG. 2, according to another embodiment of the present invention.

Referring to FIG. 25, the data reconstruction system 23 may include a bit parser 251, an entropy decoder 252, a mode recognition unit 253, a DPCM/PCM decoder 254, and a merger 255, for example.

The data reconstruction system 23 illustrated in FIG. 25 may also include the entropy decoder 252, compared to the similar data reconstruction system 23 illustrated in FIG. 22. Accordingly, hereinafter, only the entropy encoder 252 will be described.

The entropy decoder 252 may receive the result of the parsing from the bit parser 251, and perform entropy-decoding on the result of the parsing. In addition, the entropy decoder 252 may output the 4 bits of mode data among the result of the entropy-decoding to the mode recognition unit 222, and output 28 bits of compressed data among the result of the entropy-decoding to the DPCM/PCM decoder 223. Alternatively, for example, the entropy decoder 252 may output 4 bits of mode data among the result of the entropy-decoding, to the mode recognition unit 222, and output 28 bits of compressed data and 2 bits of predicted direction data among the result of the entropy-decoding to the DPCM/PCM decoder 223.

As described above, if the entropy-encoding operation is added to the data compression process, and the entropy-decoding operation is added to the data reconstruction process, since the entropy-encoding operation is a lossless compression method, it may be possible to achieve a higher data compression rate while enhancing subjective picture quality when images are reconstructed. However, when the complexity of an image encoder/decoder system increases, it is difficult to exactly meet a picture-based Control Bit Rate (CBR) suitable for a Liquid Crystal Display Dynamic Capacitance Compensation (LCD DCC) system.

Figure 26:
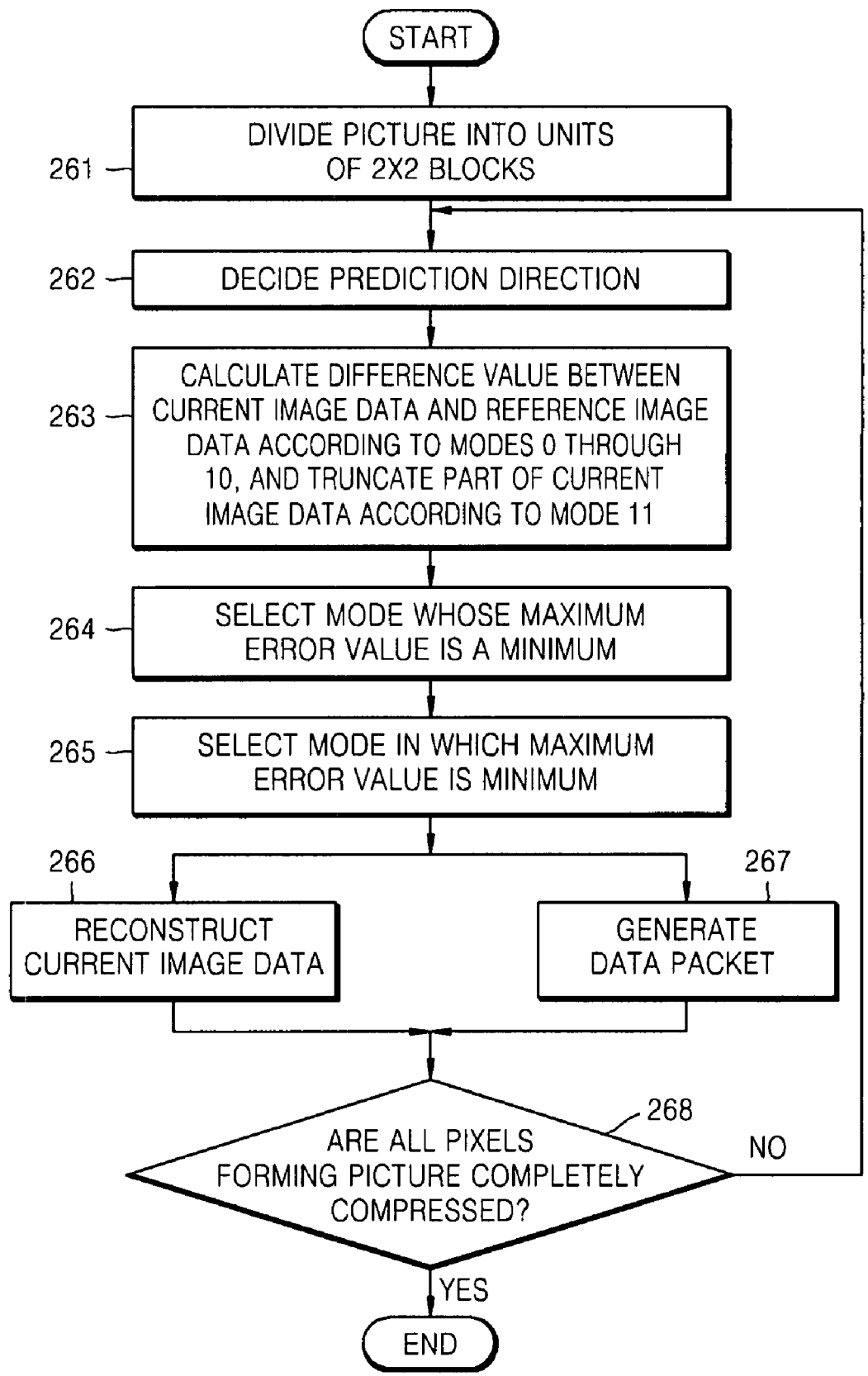
FIG. 26 illustrates a data compression method, according to an embodiment of the present invention.

FIG. 26 illustrates a data compression method, according to an embodiment of the present invention.

Referring to FIG. 26, the data compression method may include operations which are sequentially processed, e.g., by the data compression system 21 illustrated in FIG. 6, noting that alternative embodiments are equally available. Accordingly, in such an embodiment, above descriptions about the data compression system 21 illustrated in FIG. 6 may similarly be applied to the data compression method. Further, an operation of performing entropy-encoding, e.g., in correspondence to the data compression system 21 illustrated in FIG. 24, may also be included.

In operation 261, a picture may be received, and the picture may be divided into units of 2×2 blocks as illustrated in FIG. 5.

In operation 262, differences may be calculated between each of 4 pixels forming a 2×2 block, e.g., as divided in operation 261, and neighboring pixels which are respectively positioned in 4 prediction directions, and a prediction direction may be determined corresponding to a minimum value of the differences.

In operation 263, differences may be calculated between 8 bits of current image data corresponding to the respective R, G, and B components of a pixel according to example modes 0 through 10 and 8 bits of reference image data corresponding to the respective R, G, and B components of a neighboring pixel which is positioned in the prediction direction determined in operation 262, and a portion of the 8 bits of current image data corresponding to the respective R, G, and B components may be truncated according to a mode 11, for the 4 pixels forming the 2×2 block divided in operation 261, thereby compressing the current image data.

In operation 264, it may be determined whether the difference between the 8 bits of current image data corresponding to the G component and the 8 bits of reference image data corresponding to the G component can be represented by 3 bits, for example, and whether the difference between the 8 bits of current image data corresponding to the respective R and B components and the 8 bits of reference image data corresponding to the respective R and B components can be represented by 2 bits, also for example.

In operation 265, a mode can be selected corresponding to a maximum error value that can be generated between the current image data and its reconstructed data being minimum, from among modes in which the difference can be represented by a fixed length of bits.

In operation 266, the compressed data corresponding to the respective R, G, and B components of the pixel may be added to reference image data corresponding to the R, G, and B components of a neighboring pixel which is positioned in the prediction direction decided in operation 262, for the 4 pixels forming the 2×2 block, according to the mode selected in operation 265, or a predetermined value may be added to the compressed data corresponding to the respective R, G, and B components, thereby reconstructing the current image data corresponding to the respective R, G, and B components.

In operation 267, a total of 32 bits of a data packet may be generated having of 28 bits of data compressed according to the mode selected in operation 265, and 4 bits of data indicating the mode selected in operation 265, among data compressed respectively according to 12 modes in operation 263, and the 32 bits of the data packet may be output to the memory 22. Alternatively, in operation 267, a total of 34 bits of a data packet may be generated, such that the data packet further includes 2 bits of data indicating a prediction direction decided by the intra prediction unit 62, further to the 28 bits of compressed data and the 4 bits of mode data.

In operation 268, it may be determined whether all pixels forming a picture are completely compressed, and operation 262 may be returned to if all pixels forming a picture are not completely compressed or the process may be terminated if all pixels forming a picture are completely compressed.

Figure 27:
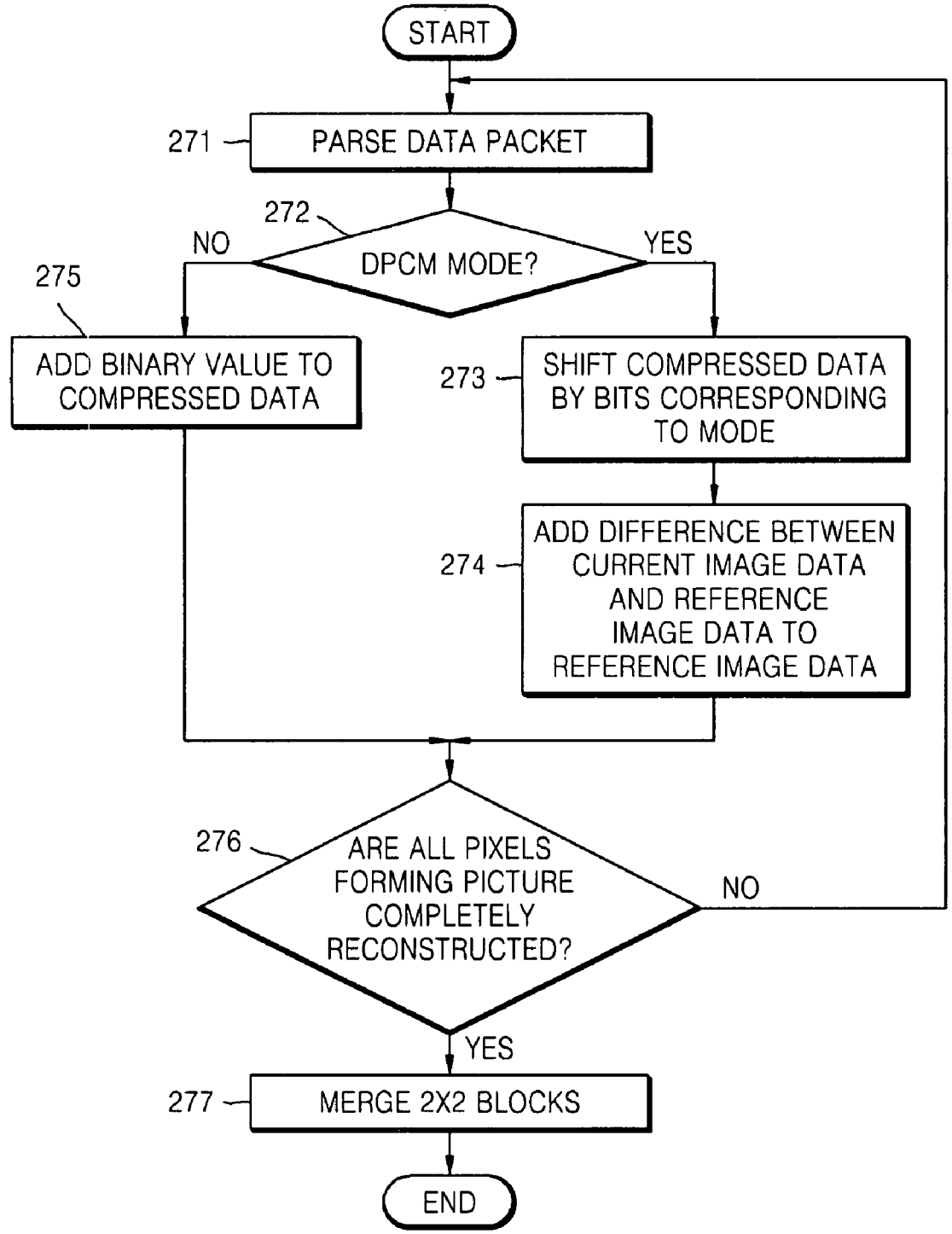
FIG. 27 illustrates a data reconstruction method, according to an embodiment of the present invention.

FIG. 27 illustrate a data reconstruction method, according to an embodiment of the present invention.

Referring to FIG. 27, the data reconstruction method includes operations that may be sequentially processed, e.g., by the data reconstruction system 23 illustrated in FIG. 22, noting that alternative embodiments are equally available. Accordingly, in such an embodiment, the above descriptions about the data reconstruction system 23 illustrated in FIG. 22 may be similarly applied to the data reconstruction method.

In operation 271, 32 bits of a data packet may be read from the memory 22, for example, then parsed, and 4 bits of mode data and 28 bits of compressed data may be extracted from the 32 bits of the data packet. Alternatively, in operation 271, 34 bits of a data packet may be read, rather than the above-mentioned 32 bits of the data packet, from the memory 22, then parsed, and 4 bits of mode data, 28 bits of compressed data, and 2 bits of predicted direction data may be extracted from the 34 bits of the data packet.

In operation 272, a mode selected by the data compression system 21, for example, from among 12 modes for compressing current image data corresponding to a 2×2 block, may be recognized from the 4 bits of mode data extracted in operation 271, and operation 273 may be proceeded to if the recognized mode is one of modes 0 through 10, and operation 275 may be proceeded to if the recognized mode is mode 11, for example.

In operation 273, compressed data corresponding to the respective R, B, and G components of a pixel extracted in operation 271 may be shifted by the number of bits corresponding to the mode recognized in operation 272, for the 4 pixels forming the 2×2 block. Then, a binary value corresponding to the mode recognized in operation 272 may be added to the compressed data subjected to bit-shifting, thereby reconstructing differences between current image data corresponding to the respective R, G, and B components and reference image data corresponding to the respective R, G, and B components.

In operation 274, the differences, e.g., reconstructed in operation 273 may be added to 8 bits of reference data corresponding to the respective R, G, and B components of a neighboring pixel which is positioned in the prediction direction indicated by the 2 bits of prediction direction data extracted in operation 271, thereby reconstructing 8 bits of current image data corresponding to each of the R, G, and B components.

In operation 275, 5 bits of a binary value may be added to the 3 bits of compressed data corresponding to the G component among the 28 bits of compressed data received in operation 271, and 6 bits of a binary value may be added to the 2 bits of compressed data corresponding to the respective R and B components among the 28 bits of compressed data, for four pixels forming a 2×2 block, thereby reconstructing 8 bits of current image data corresponding to the respective R, G, and B components.

In operation 276, it may be determined whether all pixels forming a picture are completely reconstructed, and operation 271 may be returned to if all pixels forming a picture are not completely reconstructed, or the process may be terminated if all pixels forming a picture are completely reconstructed.

In operation 277, a total of 96 bits of 2×2 a blocks may be merged, thereby reconstructing a picture, wherein the 2×2 block is made up of 4 pixels, and each pixel includes R, G, B components which each have 8 bits of current image data and are reconstructed in operation 274 or 275.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, by compressing and/or reconstructing image data selectively using one of a DPCM and PCM methods, it is possible to significantly lower the complexity of an image encoder/decoder system, and, for example, exactly meet a picture-based Control Bit Rate (CBR) suitable for a Liquid Crystal Display Dynamic Capacitance Compensation (LCD DCC) device/system. In particular, according one or more embodiments of the present invention, since data is compressed or reconstructed in units of 2×2 pixel blocks, with each block made up of 4 pixels, using the DPCM method and the PCM method, it is possible to potentially 1/3-compress original data without deteriorating subjective picture quality of the original data.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A data compression method, comprising:
  compressing current data according to a plurality of compression modes for differently compressing the current data;
  determining whether the respectively compressed current data according to the plurality of compression modes can be represented by a predetermined fixed length of bits;
  selecting a compression mode, from among one or more of the compression modes in which the respectively compressed current data is represented by the predetermined fixed lengths of bits; and
  outputting the compressed current data according to the selected compression mode.

2. The method of claim 1, wherein the compressing of the current data comprises parallel compressing the current data according to respective compression modes.

3. The method of claim 1, wherein the compressing of the current data comprises compressing the current data by calculating a difference between the current data and reference data, according to particular compression modes among the plurality of compression modes, and truncating at least one portion of the current data to generate corresponding compressed current data according to remaining compression modes, of the plurality of compression modes excluding the particular compression modes.

4. The method of claim 3, wherein the compressing of the current data further comprises shifting bits of the current data and the reference data by a predetermined number of bits corresponding to the select compression mode, and calculating a difference between the shifted current data and the shifted reference data.

5. The method of claim 1, wherein the compressing of the current data further comprises compressing the current data, as image data, in units of 2×2 pixel blocks, each 2×2 block being made up of 4 pixels.

6. The method of claim 1, further comprising:
  calculating a plurality of difference values between each of a plurality of pixels forming a block having a predetermined size and a plurality of neighboring pixels of each pixel, which are respectively positioned in a plurality of prediction directions, and determining a prediction direction corresponding to a minimum difference value among the plurality of difference values for a pixel represented by the current data,
  wherein the compressing of the current data further comprises compressing the current data by calculating a difference between the current data and reference data corresponding to a neighboring pixel which is positioned in the decided prediction direction.

7. The method of claim 1, wherein the selecting of the compression mode further comprises selecting the compression mode in which a maximum error values generated between the current data and a reconstructed data of the current data, as reconstructed from a corresponding compressed current data, is a minimum, from among the one or more compression modes.

8. The method of claim 7, wherein the selecting of the compression mode further comprises:
  checking priorities of the one or more compression modes in which corresponding compressed data can be represented by the fixed length of bits;
  calculating a maximum error value according to a compression mode, of the one or more compression modes, having a highest priority;
  correcting a difference between the data and reference data according to a compression mode having a priority higher than the highest priority;
  calculating a maximum error value according to the corrected difference; and
  selecting the select compression mode from the one or more compression modes having a smaller error value of a comparison of the maximum error value calculated according to the compression mode having the highest priority and the maximum error value calculated according to the corrected difference.

9. The method of claim 1, further comprising:
  calculating a plurality of difference values between each pixel of a plurality of pixels forming a block having a predetermined size and a plurality of neighboring pixels of each pixel of the plurality of pixels, which are respectively positioned in a plurality of prediction directions, and determining a prediction direction corresponding to a minimum difference value among the plurality of difference values for a pixel represented by the data; and
  compressing the data to generate the select compressed data by calculating a difference between the data and reference data corresponding to a neighboring pixel which is positioned in the decided prediction direction.

10. The method of claim 1, wherein the data is pixel data divided from image data in units of 2×2 pixel blocks, with each 2×2 block being made up of 4 pixels.

11. At least one non-transitory medium comprising computer readable code to control at least one processing element to implement the data compression method of claim 1.

12. A system with data compression, comprising:
  a compression unit to compress current data according to a plurality of compression modes for differently compressing the current data;

a length check unit to determine whether the respectively compressed current data according to the plurality of compression modes can be represented by a predetermined fixed length of bits;

a selection unit to select a compression mode, from among one or more of the compression modes in which the respectively compressed current data is represented by predetermined fixed lengths of bits; and a bit packeting unit to generate a packet of a predetermined number of bits, including the compressed current data according to the selected compression mode, and output the generated packet.

13. A data reconstruction method for reconstructing a current data from compressed current data represented by predetermined fixed lengths of bits, comprising:

recognizing a compression mode, from among a plurality of predetermined compression modes to selectively differently compress components of the current data, from the compressed current data as a corresponding compression of the current data; and reconstructing the current data from the compressed current data based on the recognized compression mode by performing a selected one of either adding the compressed current data to reference data or adding a predetermined binary value to the compressed current data.

14. The data reconstruction method of claim 13, wherein the compressed current data represents a difference between the current data and the reference data or a fixed length of bits corresponding to a portion of the current data.

15. The data reconstruction method of claim 13, wherein the reconstructing of the current data further comprises reconstructing a difference between a current data and the reference data by shifting the compressed current data by a predetermined number of bits corresponding to the recognized compression mode, and adding the reconstructed difference to the reference data.

16. The data reconstruction method of claim 13, wherein the reconstructing of the current data further comprises, when the compressed current data is determined to be represented by a value having a maximum value of bit values that can form corresponding compressed data, increasing the predetermined binary value, and adding the increased predetermined binary value to the compressed current data.

17. The data reconstruction method of claim 13, wherein the reconstructing of the current data comprises, when the compressed current data is determined to be represented by a value having a minimum value of bit values that can form corresponding compressed data, decreasing the predetermined binary value, and adding the decreased predetermined binary value to the compressed current data.

18. The data reconstruction method of claim 13, wherein, in the adding of the current data to the reference data, the reference data is data of a neighboring pixel positioned in a prediction direction from a pixel represented by the current data, the prediction direction being indicated by predicted direction data included in the compressed current data.

19. The data reconstruction method of claim 13, wherein the reconstructing of the current data comprises reconstructing the current data in units of 2×2 pixel blocks, with each 2×2 block being made up of 4 pixels.

20. At least one non-transitory medium comprising computer readable code to control at least one processing element to implement the method of claim 13.

21. A system with data reconstruction, to reconstruct a current data from compressed current data represented by predetermined fixed lengths of bits, the system comprising:

a recognition unit to recognize a compression mode, from among a plurality of predetermined compression modes to selectively differently compress components of the current data, from the compressed current data as a corresponding compression of the current data; and a decoding unit to reconstruct and output the current data from the compressed current data based on the recognized compression mode by performing a selected one of either adding the compressed current data to reference data or adding a predetermined binary value to the compressed current data.

* * * * *

UNITED STATES PATENT AND TRADEMARK OFFICE
CERTIFICATE OF CORRECTION

PATENT NO. : 8,345,753 B2
APPLICATION NO. : 11/890497
DATED : January 1, 2013
INVENTOR(S) : Sang-jo Lee et al.

Page 1 of 1

It is certified that error appears in the above-identified patent and that said Letters Patent is hereby corrected as shown below:

In the Claims:

Column 19; Line 47; In Claim 1, delete "lengths" and insert -- length --, therefor.
Column 20; Line 21; In Claim 7, delete "values" and insert -- value --, therefor.

Signed and Sealed this
Seventh Day of May, 2013

Teresa Stanek Rea
*Acting Director of the United States Patent and Trademark Office*